(12) United States Patent
Howard

(10) Patent No.: US 10,148,425 B2
(45) Date of Patent: Dec. 4, 2018

(54) SYSTEM AND METHOD FOR SECURE COMMUNICATIONS AND DATA STORAGE USING MULTIDIMENSIONAL ENCRYPTION

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 0 days.

(21) Appl. No.: 15/668,279

(22) Filed: Aug. 3, 2017

(65) Prior Publication Data

US 2017/0346622 A1    Nov. 30, 2017

Related U.S. Application Data

(63) Continuation-in-part of application No. 14/091,050, filed on Nov. 26, 2013.

(60) Provisional application No. 61/729,889, filed on Nov. 26, 2012.

(51) Int. Cl.
*H04L 9/06* (2006.01)
*H04L 9/08* (2006.01)
*H04L 9/14* (2006.01)

(52) U.S. Cl.
CPC ............ *H04L 9/0618* (2013.01); *H04L 9/065* (2013.01); *H04L 9/0637* (2013.01); *H04L 9/0838* (2013.01); *H04L 9/0861* (2013.01); *H04L 9/14* (2013.01); *H04L 2209/24* (2013.01)

(58) Field of Classification Search
CPC ... H04L 9/0618; H04L 9/0838; H04L 9/0861; H04L 9/065
See application file for complete search history.

(56) References Cited

U.S. PATENT DOCUMENTS

| 6,185,679 B1 * | 2/2001 | Coppersmith .......... H04L 9/002 380/37 |
| 2002/0021801 A1 | 2/2002 | Shimoyama |

(Continued)

FOREIGN PATENT DOCUMENTS

EP    0982894 B1    10/2006

OTHER PUBLICATIONS

PCT Patent Application PCT/US2013/072065 International Search Report and Written Opinion dated Mar. 6, 2014.
(Continued)

*Primary Examiner* — Meng Li
(74) *Attorney, Agent, or Firm* — Lathrop Gage LLP

(57) ABSTRACT

An encryption system and method has processors and a memory system, the memory system configured to hold at least one macroblock, an encryption key, and machine-readable instructions for encrypting the macroblock. The instructions include instructions for dividing the macroblock into subblocks by rows and encrypting the rows, for dividing the macroblock into subblocks by columns and encrypting the columns, and for performing a combining cipher of the cipher blocks to produce a final ciphertext of the macroblock. In alternative embodiments, the macroblock is divided in dimensions in addition to rows and columns. In embodiments, ciphertext is chained by using its ciphertext as part of a key for later macroblocks of a sequence, or propagated into later sequences of macroblocks.

19 Claims, 15 Drawing Sheets

(56) References Cited

U.S. PATENT DOCUMENTS

| | | | |
|---|---|---|---|
| 2003/0195938 A1* | 10/2003 | Howard | G06F 8/45 |
| | | | 709/208 |
| 2007/0076868 A1* | 4/2007 | Ming | G09C 5/00 |
| | | | 380/54 |
| 2007/0180513 A1* | 8/2007 | Raz | H04L 29/12481 |
| | | | 726/12 |
| 2007/0237327 A1 | 10/2007 | Taylor et al. | |
| 2008/0192924 A1* | 8/2008 | Shang | H04L 9/0618 |
| | | | 380/28 |
| 2009/0110193 A1 | 4/2009 | Schlomer | |
| 2009/0279697 A1 | 11/2009 | Schneider | |
| 2010/0054461 A1 | 3/2010 | Ciet et al. | |
| 2010/0098244 A1 | 4/2010 | Ciet et al. | |
| 2010/0146303 A1 | 6/2010 | Kothari et al. | |

OTHER PUBLICATIONS

Non-Final Rejection mailed in U.S. Appl. No. 14/091,050 dated Oct. 4, 2017, 8 pp.
Notice of Allowance mailed in U.S. Appl. No. 14/091,050 dated Mar. 28, 2018, 9 pp.

* cited by examiner

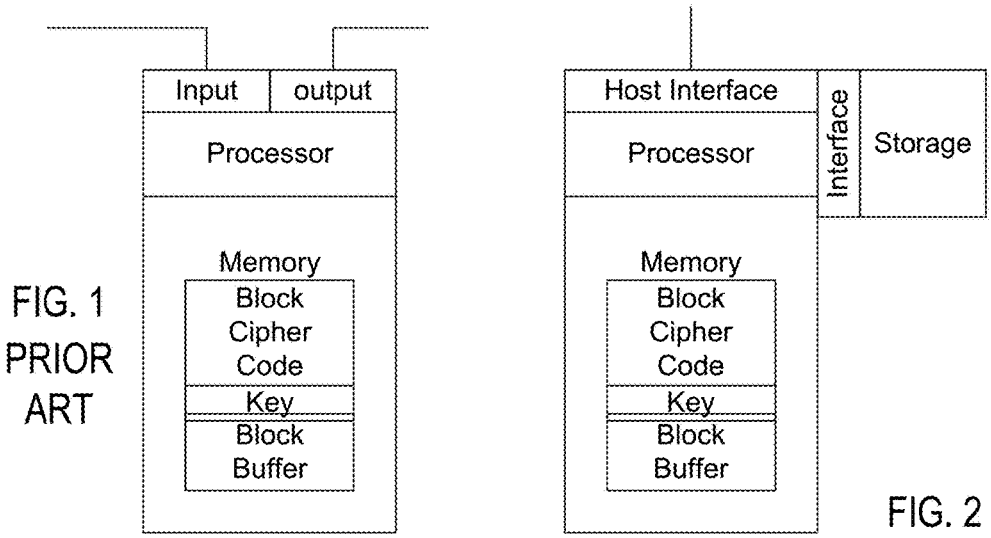
FIG. 1 PRIOR ART
FIG. 2
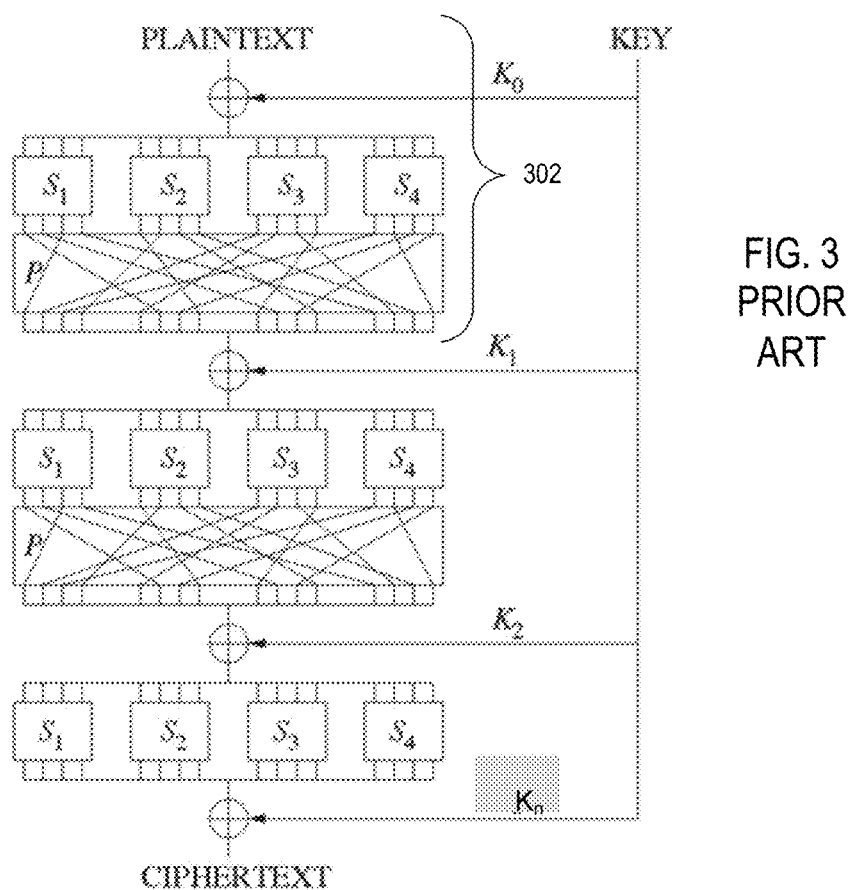
FIG. 3 PRIOR ART

2D CBC

(12) United States Patent
US 10,148,425 B2

SYSTEM AND METHOD FOR SECURE COMMUNICATIONS AND DATA STORAGE USING MULTIDIMENSIONAL ENCRYPTION

RELATED APPLICATIONS

This application is a continuation-in-part of and claims priority to U.S. application Ser. No. 14/091,050, filed Nov. 26, 2013, which claims priority to U.S. Patent Application Ser. No. 61/729,889, filed Nov. 26, 2012. The disclosure of each of the above mentioned applications is incorporated herein by reference.

FIELD

The present document relates to the field of block cyphers, including chaining block cyphers, for use in secure communications and data storage systems.

BACKGROUND

Secure communications systems and data storage systems have had great importance for military and diplomatic users for many years. These systems generally rely on physical security, where information is not accessible to unauthorized users in any form, and on encryption, where information is rendered illegible by application of some function before transmission or storage, and the function is reversed upon receipt or retrieval. Since a communications channel between two parties may often be tapped, as in the case of telephone, computer network, and radio communications, encryption of such communications is particularly common where information being transmitted could be of high value to third parties. Similarly, information, whether data or computer programs, is often encrypted for storage to prevent access by unauthorized parties.

Secure communications are of importance outside the military and diplomatic corps also. In the banking industry, a malicious party who broke into the teller-machine networks, into the credit and debit card networks, or into bank account databases could conceivably access large sums of money. Similarly, it is desirable to keep medical records secure from those not involved in care of particular patients. Companies that create engineering designs need to protect that information to prevent intellectual property theft and the loss of competitive advantage.

Many entities, including friendly and hostile governments, have invested heavily in cryptanalysis, the breaking into secure communications and data storage systems of other parties. Successful decryption of Japanese "Purple", Japanese naval codes, and German Enigma cyphers by the Allies, and decryption of British merchant-marine codes by Germans all played an important part in World War II, just as decryption of the Zimmerman telegram played a part in dragging the United States into World War I. Hardware and software capable of breaking into many older, lower-security systems, like the "WEP" system commonly used for encrypting 802.11B/G wireless computer networks, is commonly available. Since computerized cryptanalysis technology is continually advancing, it is desirable to find better, more secure, yet faster, systems for encrypting and decrypting both communications and stored data.

Historical cipher systems often had two or more levels of security; for example the Naval version of the Enigma system used by Germany in World War II had a general level and an "officer-only" level. In that system, some high-security messages were enciphered first with an "officer-only" key, then an additional header was added and the message re-enciphered with a general-use key.

SUMMARY

In a first aspect, a system for multidimensional encryption comprises a host interface storing input plaintext and including a processor and computer readable instructions that when executed by the processor generate a macroblock array, having a plurality of rows, based on the input plaintext. The system may comprise a first dimension cipher structure configured to receive the plurality of rows and perform a first cipher operation to generate row ciphertext. The system may also comprise a second dimension cipher structure configured to receive column input data based on columns within the row ciphertext, and perform a second cipher operation to generate column cipher text.

In embodiments of the first aspect, the first dimension cipher structure may include a plurality of row cipher units including memory storing respective one or more of the received plurality of rows, and the row ciphertext corresponding thereto.

In embodiments of the first aspect, the plurality of row cipher units configured to process in parallel to each other.

In embodiments of the first aspect, the second dimension cipher structure may include a plurality of column cipher units including memory storing respective one or more of the received columns, and the column ciphertext corresponding thereto.

In embodiments of the first aspect, the plurality of column cipher units may be configured to process in parallel to each other.

In embodiments of the first aspect, the plurality of column cipher units and the plurality of row cipher units may be configured according to a Howard Cascade such that transmittal of the columns of row cipher text from the row cipher units to the column cipher units occurs based on a coordinated communication scheme.

In embodiments of the first aspect, the second dimension cipher structure may include the same hardware as the first dimension cipher structure.

In embodiments of the first aspect, the first cipher operation may be different from the second cipher operation.

In embodiments of the first aspect, the column input data may be transposed from the row ciphertext.

In embodiments of the first aspect, the system may further comprise an additional dimension cipher structure configured to receive additional data based on the column ciphertext, and perform an additional cipher to generate additional ciphertext.

In embodiments of the first aspect, the column ciphertext may be combined into a final ciphertext having a length equal to a length of the input plaintext.

In a second aspect, a method for multidimensional encryption of data may comprise generating a macroblock array, based on an input plaintext, having a plurality of rows of data. The method may further comprise transmitting the rows of data to a first dimension cipher structure. The method may further comprise performing a first cipher operation on the rows within the first dimension cipher structure to generate row ciphertext. The method may further comprise transmitting columns of data within the row ciphertext to a second dimension cipher structure. The method may further comprise performing a second cipher operation on the columns of data to generate a column ciphertext.

In embodiments of the second aspect, the step of transmitting columns of data may include transposing the row ciphertext to the second dimension cipher structure.

In embodiments of the second aspect, the step of transmitting the rows of data may include transmitting respective one or more of the plurality of rows to each of a plurality of row cipher units.

In embodiments of the second aspect, the step of performing a first cipher operation may include performing the first cipher operation by each of the plurality of row cipher units in parallel.

In embodiments of the second aspect, the step of transmitting the columns of data may include transmitting respective one or more of the columns of data to each of a plurality of column cipher units.

In embodiments of the second aspect, the step of performing a second cipher operation may include performing the second cipher operation by each of the plurality of column cipher units in parallel.

In embodiments of the second aspect, each of the plurality of column cipher units and the plurality of row cipher units may be configured according to a Howard Cascade such that transmittal of the columns of row cipher text from the row cipher units to the column cipher units occurs based on a coordinated communication scheme In embodiments of the second aspect, the second cipher operation may be different from the first cipher operation.

In embodiments of the second aspect, the method may further comprise combining the column ciphertext to generate a final ciphertext having the same length as the input plaintext.

BRIEF DESCRIPTION OF THE FIGURES

FIG. 1 is a block diagram of a prior art device for encrypting or decrypting a communications signal stream.

FIG. 2 is a block diagram of a prior art device for encrypted data storage.

FIG. 3 is a block diagram illustrating a prior art block cipher including transposition and substitution boxes.

DETAILED DESCRIPTION OF THE EMBODIMENTS

Figure 3A:
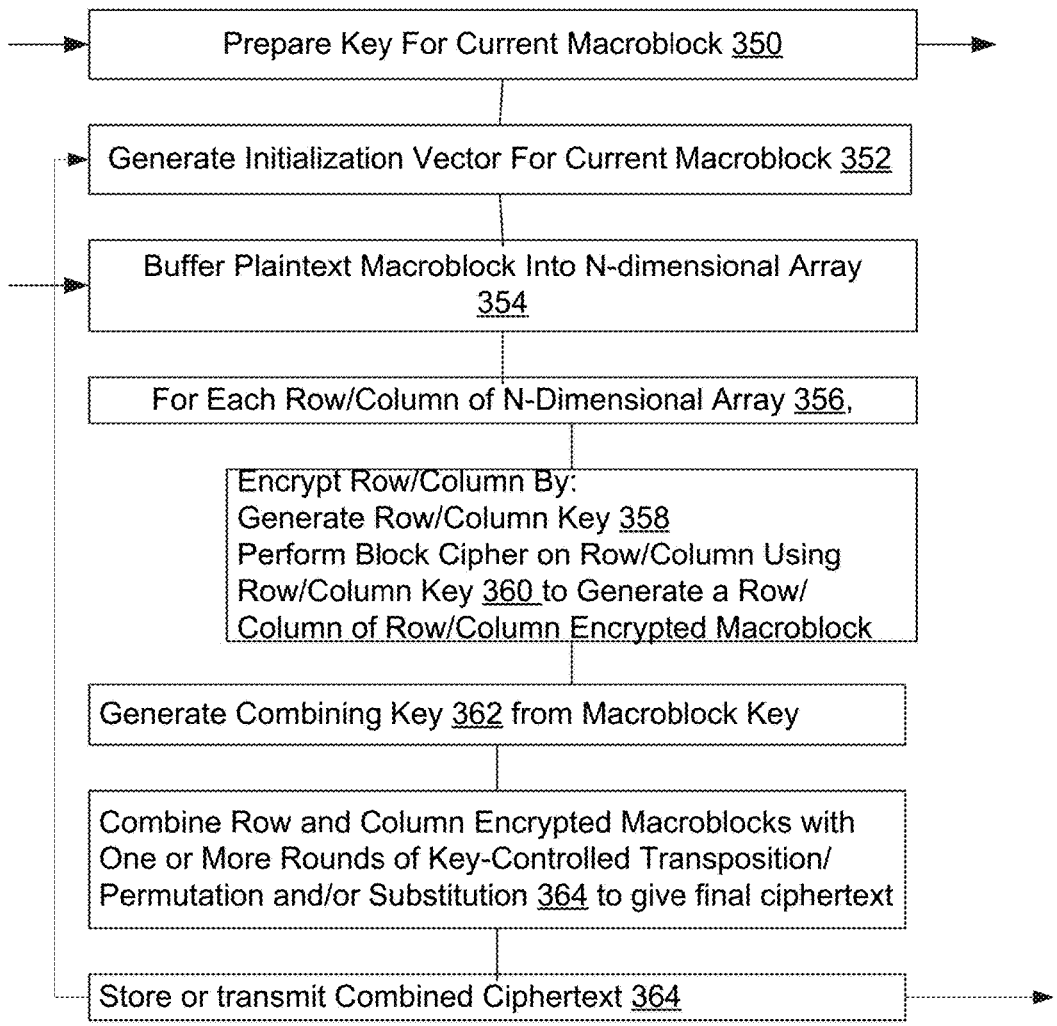
FIG. 3A is a flowchart of a generic multidimensional encryption as described herein.

An encrypted cipher machine, as illustrated in FIG. 1, receives an unencrypted input and produces an encrypted output. The machine typically has a processor and a memory, the memory being configured with machine-readable code for executing an encryption method and for retaining an encryption key for use in performing encryption. A typical system also has a block buffer in the memory into which a block of data is received from the input, the processor executes the encryption method on data in the buffer using the key, and then transmits the block as encrypted output or stores it locally.

An encrypted data storage device, as illustrated in FIG. 2, receives an unencrypted input, stores data in permanent or removable media in encrypted form, and returns unencrypted data to a host system. The machine typically has a processor and a memory, the memory being configured with machine-readable code for executing an encryption method and a compatible decryption method and for retaining an encryption key for use in performing encryption; the encryption key may be stored in volatile memory. A typical system also has a block buffer in the memory into which a block of data is received from the host system. The processor executes the encryption method on data in the buffer using the key then stores the block as encrypted data on the storage device. When data is desired by a host system, the processor controls reading of blocks of the encrypted data from storage device into the buffer, executes the decryption method to transform the block in the buffer to unencrypted data, and returns the unencrypted data to the host.

A prior-art block cipher encryption method useful in the systems of FIG. 1 or FIG. 2 is illustrated in FIG. 3. A "round" consists of several processing steps, each containing four similar but different stages, including one that depends on the encryption key itself. A set of reverse rounds are applied to transform ciphertext back into the original plaintext using the same encryption key. The following definitions/procedures for each "step" are relevant to the method shown in FIG. 3.

KeyExpansions

Round keys are derived from the cipher key using Rijndael's key schedule, as described at https://en.wikipedia.org/wiki/Rijndael_key_schedule. AES requires a separate 128-bit round key block for each round plus one more.

InitialRound:

AddRoundKey—each byte of the state is combined with a block of the round key using bitwise xor.

Rounds:

SubBytes—a non-linear substitution step where each byte is replaced with another according to a lookup table, such as the Rinjdael S-box.

ShiftRows—a transposition step where the last three rows of the state are shifted cyclically a certain number of steps.

MixColumns—a mixing operation which operates on the columns of the state, combining the four bytes in each column.
AddRoundKey:
Final Round (no MixColumns)
SubBytes
ShiftRows
AddRoundKey The cipher method shown in FIG. 3 generates a sequence of round keys $K_0, K_1, \ldots, K_m$ from the key. A round function 302 includes a key-controlled transformation of buffer data, followed by "substitution box" where sections of buffer data are replaced with transformed data, which may or may not be key-controlled, and a "permutation box" where an order of buffer data bits is scrambled in a determinable pattern, which may or may not be key-controlled. The round function is iterated for each round key $K_i$ (i=0 to n) in order to encrypt each block. This illustrated block cipher method is just one of many possible block ciphers.

A block cipher generally is two paired algorithms, one for encryption, E(b,K), and the other for decryption, D(c,K). Both algorithms accept two inputs: an input block b of size n bits and a key K of size k bits, and both yield an n-bit output block, such as ciphertext block c. The decryption algorithm D(c,K) is defined to be the inverse function of encryption: $D=E^{-1}$. Block ciphers may be implemented in many ways, and certain specific block ciphers are common fundamental units in encryption systems. Some block ciphers incorporate combinations of substitutions and permutations in a round function and repeat the round function multiple times during encryption of each block.

Multidimensional Block Cipher Mode Encryption

The embodiments discussed herein may be used to generate cyphertext (e.g. an encrypted data) that is stored in memory or otherwise communicated. In other words, the encrypted output need not be communicated to another device, but may be stored in memory (e.g., any one or more of volatile, non-volatile, single computer, or large computing cluster memory) increasing the security of that data on said local memory. As such, "communication", or "communications medium" as used herein may include a communication channel between two devices, within a single device, or local memory within a given device.

A multidimensional block cipher method is illustrated in FIG. 3A. This method begins with generating (350) a macroblock key for encrypting the current macroblock. In an embodiment, the macroblock key is generated from a session master key. A macroblock initialization vector may also be generated 352. In electronic codebook implementations, the initialization vector may be a constant or derived from the macroblock key; in block-chaining, propagating, or similar embodiments, the initialization vector may be derived from a prior block or a prior message.

Next, the macroblock cipher begins with buffering a large block of data to be encrypted, herein referenced as a macroblock. A linear representation of the extended plaintext macroblock bit (1 . . . x) is mapped into "y" multiple linear blocks of length m=x/y. The macroblock can be padded with empty data (zero bits) to ensure that x is an integer multiple of y.

TABLE 1

Example Two-Dimensional Representation of Full Plaintext Macroblock

| Bit | Bit | Bit | ... | Bit |
|-----|-----|-----|-----|-----|
| 1 | 2 | 3 |  | m |
| Bit | Bit | Bit | ... | Bit |
| (1 + m) | (2 + m) | (3 + m) |  | 2m |
| Bit | Bit | Bit | ... | Bit |
| (1 + 2m) | (2 + 2m) | (3 + 2m) |  | 3m |
| . | . | . | ⋱ | . |
| . | . | . |  | . |
| . | . | . |  | . |
| Bit | Bit | Bit | ... | Bit |
| (1 + (y − 1)m) | (2 + (y − 1)m) | (3 + (y − 1)m) |  | ym = x |

This step essentially involves taking a large block, or macroblock, of plaintext and placing plaintext from the block into an array of N (the encryption dimensionality) dimensions. An illustration of this process is given in Table 1, assuming that N is 2. In an embodiment, the plaintext of the macroblock is distributed into the array as rows or columns of bits. In an alternative embodiment, the plaintext of the macroblock is distributed into the array as rows or columns of characters or bytes.

For example, a 100-bit block may be mapped as a 10-by-10 two-dimensional array, a 1000-bit block as a 10-by-10-by-10 three-dimensional array, and a 400-bit block as a 20-by-20 two-dimensional array.

It should be noted that, while two dimensions, involving rows and columns, are shown in the figures, this is for simplicity of representation; it is intended that any of the embodiments herein described may be built with two, three, four, or more dimensions. Further, while one row and one column is shown in each figure for simplicity, the number of rows or columns in any of the embodiments will be an integer number greater than one of rows, with an integer number greater than one of columns.

Embodiments having three dimensions may divide macroblocks into planes, and then further subdivide the macroblocks into rows and columns within each plane.

Once the macroblock is buffered in the array, in block chaining or propagating embodiments, the initialization vector is applied. In a particular embodiment, the vector is XOR-ed with the plaintext in the array.

The multidimensional encryption continues by encrypting data from the macroblock array into a row-encrypted macroblock array by, for 356 each row of the array, generating a row key 358 from the macroblock key and performing a block cipher 360 on the row using the row key. This produces a row-encrypted macroblock.

The multidimensional encryption also encrypts data from the macroblock array into a column-encrypted macroblock array by, for 356 each column of the array, generating a column key 358 from the macroblock key and performing a block cipher 360 on the column using the column key. This produces a column-encrypted macroblock.

For each dimension beyond two, the multidimensional encryption also encrypts data from the macroblock array into an additional encrypted macroblock array, such as a plane-encrypted macroblock, by, for 356 each additional dimension of the array, generating additional row and column keys 358 from the macroblock key and performing a block cipher 360 on each row and column of each plane in the additional dimension using the additional generated row and column keys. This produces an additional encrypted macroblock for each dimension, such as a plane-encrypted macroblock. In a three-dimensional encryption, each plane of the encrypted macroblock may include multiple row-encrypted and column encrypted blocks.

Next, the row-encrypted, column-encrypted, and additional encrypted macroblocks for each additional dimension are further encrypted and combined 364 to generate a combined ciphertext using a combination key derived 362 from the macroblock key and a combining method including at least one round of key-dependent transposition/permutation or transposition/permutation-substitution.

To ensure that each dimension is encrypted independently, the row and column encryptions performed for each dimension each has its own key (or subkey) and vectors. In an embodiment, individual row keys are derived from predetermined row-key bits of the macroblock key, individual column keys are derived from non-overlapping, predetermined, column-key bits of the macroblock key, and the combining key is derived from non-overlapping, predetermined, combining-key bits of the macroblock key.

Once the row and column encrypted macroblocks have been combined to create combined final ciphertext, this ciphertext is recorded on memory, which may be volatile or non-volatile, or transmitted over a communications medium to a receiving system where the ciphertext may be decrypted.

In some chaining and/or propagating embodiments, the generated final ciphertext is used in turn to generate 352 an initialization vector for the following block.

This leads to the following multidimensional definitions of the standard block cipher mode encryptions.

Multidimensional Electronic Codebook (ECB) Mode Encryption

Figure 4:
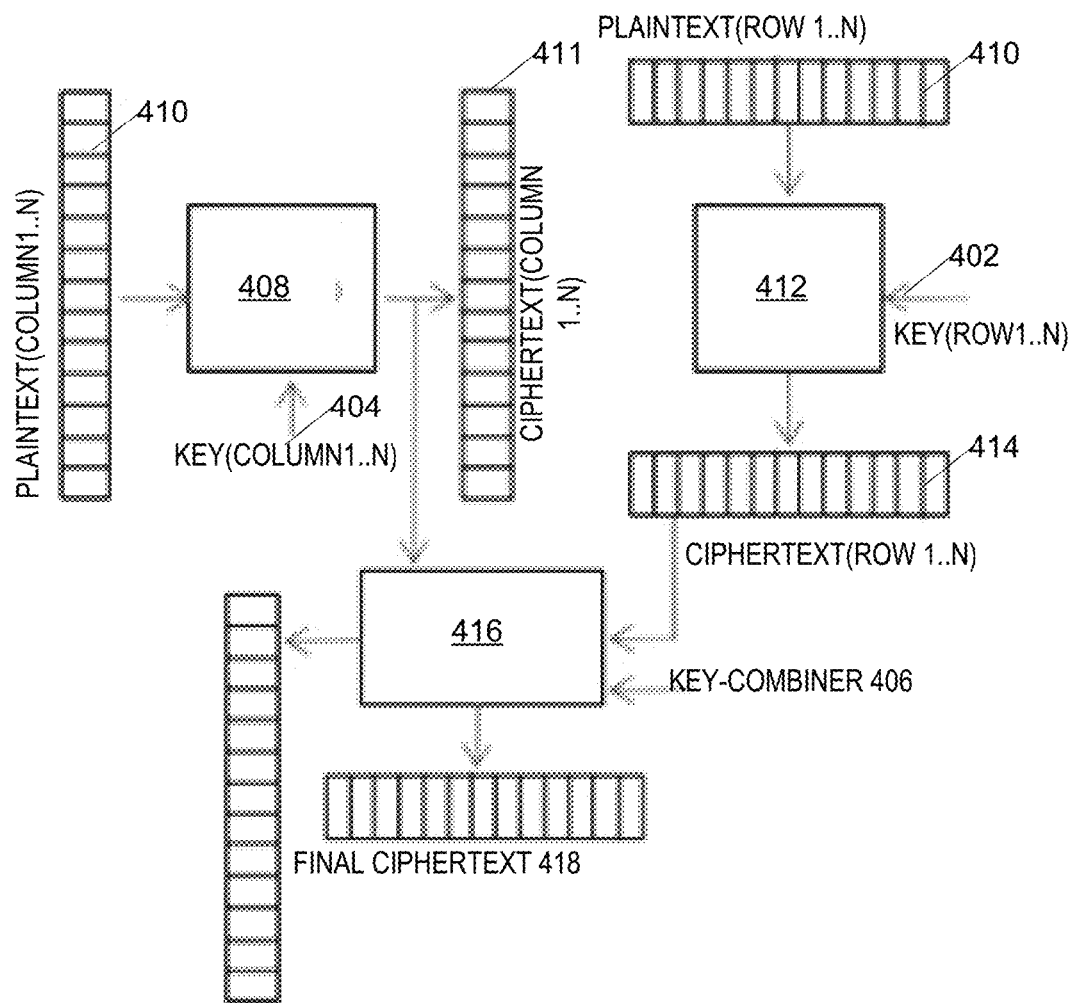
FIG. 4 is a block diagram illustrating a basic two-dimensional electronic codebook block cipher.

FIG. 4 shows an example of a two-dimensional electronic codebook (ECB) mode encryption scheme. A two-dimensional ECB creates ciphertext that is twice the size of the plaintext and a three-dimensional ECB creates a ciphertext that is three times the size of the plaintext. This is because the ciphertext forms a tuple: C(row, column) for two dimensions or C(row, column, depth) for three dimensions.

In the two-dimensional ECB there is one key or subkey per row 402 and one key or subkey per column 404. The keys or subkeys can be related to a single, exposed master key for the row ($\text{Key}_{row[1]}$) and a single, exposed master key for the column ($\text{Key}_{column[1]}$). This concept can be extended to any number of dimensions. In effect, multiple, parallel block encryptions are performed in each dimension. The simplest way to relate the non-master keys with the master key is to add the dimension index to each non-master key. For example, a row could have the following keys: $\text{Row}_{master+1}$, $\text{Row}_{master+2}$, ..., $\text{Row}_{master+y}$. Any number of dimensions can be used in the creation of a cipher. There is also a combiner key 406.

Any relationship between a row and a column master key and the non-master row-specific and column-specific keys is possible as long as a unique new key is formed and the process is reversible (for decryption). A session is a computer science term for a period in which information is interchanged, as in "login session" when a computer and a user communicate. A session master key is a single-use key for encrypting all information exchanges during the session. In a particular embodiment, the row and column master keys are fields of a session master key. In another embodiment, the row and column keys are derived by executing a hashing algorithm on a session master key.

In general, the following ciphertext to plaintext relationship holds for multidimensional block cipher mode encryption:

$$E = p \quad \text{Eqn. 1}$$

Where E=ciphertext bit size, p=plaintext bit size.

The encryption/decryption time is far less for the higher dimensional encryption/decryption models. FIG. 4 shows the effect of adding keyed permutation boxes to the ECB mode encryption.

$$D_{Key} = \text{Key}_{dim(1)} \oplus \text{Key}_{dim(2)} \ldots \oplus \text{Key}_{dim(n)} \quad \text{Eqn. 2}$$

$$P_d = D_{Key} \bmod (D_p) \quad \text{Eqn. 3}$$

Where: $P_d$=Selected dimensional permutation, $D_p$=# dimensional permutations, mod( )=arithmetic modulus function, $\oplus$ is the bitwise XOR operator, and $\text{Key}_{dim(X)}$=a key for dimension x.

Therefore, a column block cipher 408, controlled by the column keys 404, is executed 360 on each column of a macroblock of plaintext 410 to form column ciphertext 411. Similarly, a row block cipher 412, controlled by row keys 402, is executed on each row of the macroblock of plaintext 410 to form row ciphertext 414.

A two-dimensional permutation box may be used for, or as part of, the combining function 364 or unit 416. Consider that as long as both dimensions are the same size, then permutations of two of those dimensions can be implemented as a mathematical transposition as shown in FIG. 5a between a $\text{column}_x$ and a $\text{row}_x$. Once a transposition is set up, a permutation can occur simultaneously by interchanging some bits within the same column or same row instead of swapping them between row to column. Further, some bits may be transposed between columns, or between rows. An additional round of substitution and permutation may in some embodiments be performed by the combiner. The combiner produces final ciphertext 418.

Since the number of dimensional permutations is a factorial of the dimension count, it becomes possible to select a different permutation based on which dimensions are transposed and permutated. Permuting the dimensions adds cross-dimensional information to the cipher. This offers a unique way to also increase the Shannon Confusion, further increasing the strength of the encryption. Notice that other than the multidimensional permutation box, all encryption/decryption work is parallel. This inherent parallelism coupled with the fact that the effective encryption bit size is equal to multiplying all of the dimension sizes together means the encryption/decryption time is much shorter for any selected key bit length. For example, to obtain the equivalent of 256 bit encryption/decryption would be:

$$T = T_e + T_d \quad \text{Eqn. 4}$$

Where, since $16 = \sqrt{256}$ $$T_e = \text{Encryption-time}(16) + \text{"two-dimensional permutation time"} \quad \text{Eqn. 5}$$

$$T_d = \text{Decryption-time}(16) + \text{"two-dimensional permutation time"} \quad \text{Eqn. 6}$$

Versus, $$T' = T'_e + T'_d \quad \text{Eqn. 7}$$

Where $T'_e$=Encryption-time(256), and $T'_d$=Decryption-time(256).

In general, the total time T is given by the following:

$$T = T_e + T_d \quad \text{Eqn. 8}$$

$$T_e = f_e\left(\sqrt[n]{K}\right) + P_n(K) \quad \text{Eqn. 9}$$

$$T_d = f_d\left(\sqrt[n]{K}\right) + P_n(K) \quad \text{Eqn. 10}$$

where: T=total encryption decryption time, $T_e$=Encryption time, $T_d$=Decryption time, K=Encryption Key Length, $P_n$(K)=n-dimensional permutation time calculator function for key length K, n=number of dimensions used for encrypt/decrypt, $f_e$(K)=encryption processing time calculator for keys of length K function, $f_d$(K)=decryption processing time calculator for keys of length K function.

Thus, even though the ciphertext size grows linearly with the number of dimensions used, the ciphertext creation time for any effective key length is the $n^{th}$ root of the dimensionality of the encryption.

Chaining and Propagating Embodiments

While ECB implementations are sometimes preferable for data to be transmitted over a noisy channel because any one-bit error in an early macroblock will NOT prevent decryption of all following macroblocks, they have the undesirable property that successive macroblocks having the same data encrypt to the same ciphertext—permitting spoofing and some other attacks. While this can be limited by generating different macroblock keys from a session or message key for each block, an alternative suitable for use on noisy communications channels or for data storage is a chaining system where ciphertext from an early macroblock is effectively used as part of the encryption key of one or more following macroblocks. This may be done in several ways.

Multidimensional Cipher Block Chaining

Figure 5:
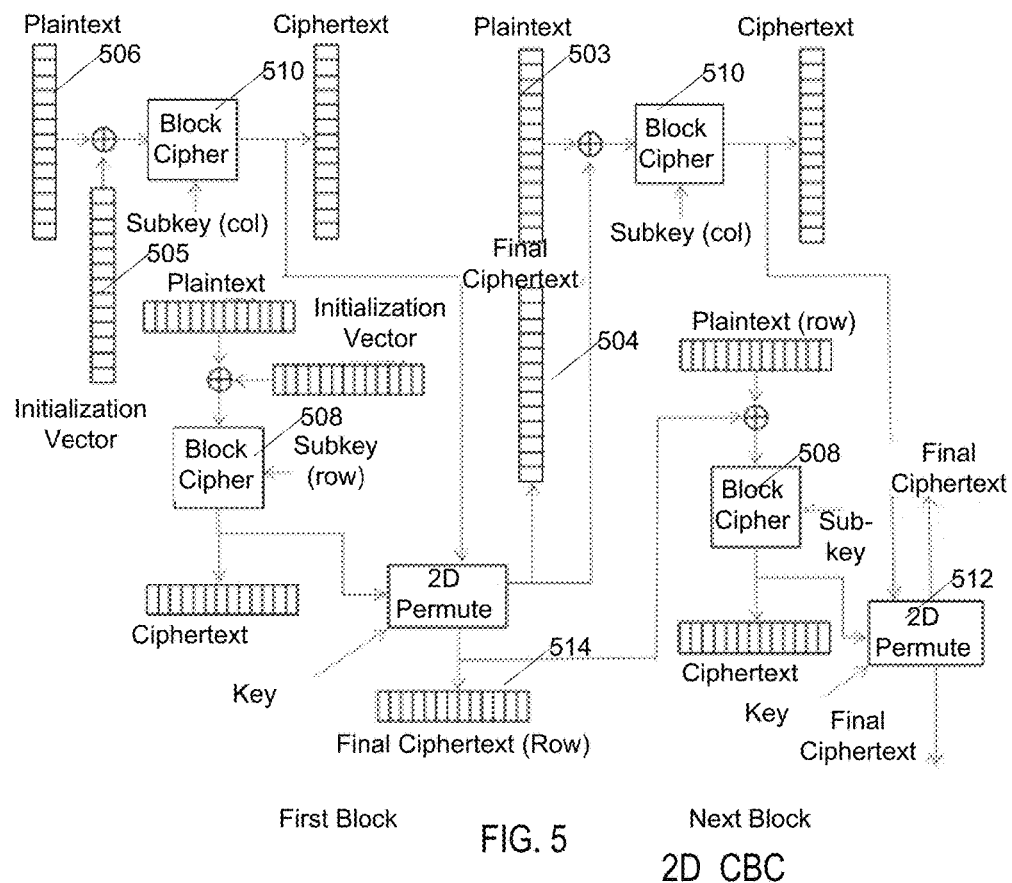
FIG. 5 is a block diagram illustrating a two-dimensional chaining, or propagating, block cipher.
Figure 5A:
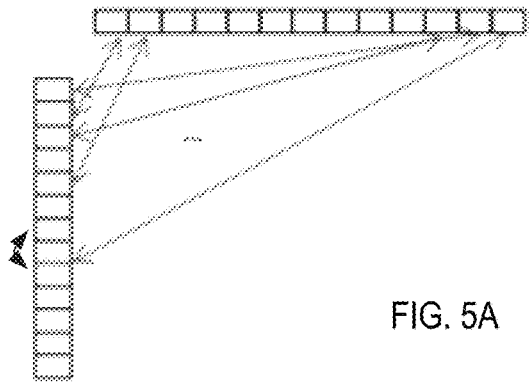
FIG. 5A is an exemplary schematic of a two-dimensional permutation block.

FIG. 5 shows an example of a two-dimensional Cipher Block Chaining mode encryption scheme. Block chaining uses ciphertext from each block to further encipher the following block, thereby ensuring Shannon Diffusion extends throughout the entire message, not just a single block—at penalty of corruption of all following blocks if even one bit of one block is corrupted during transmission. A two-dimensional CBC, like the two-dimensional ECB, creates a ciphertext that is twice the size of the plaintext. This is because the ciphertext forms a tuple: C(row, column) for two dimensions or C(row, column, depth) for three dimensions.

In an embodiment as illustrated, half of ciphertext 504 from an earlier block, or in an embodiment the immediately preceding block, is used as the initialization vector 504 or successive macroblocks 503. This effective initialization vector is then XOR-ed with the received plaintext macroblock 503 before the iterated row block ciphers 508 and column block ciphers 510 are performed. This ciphertext 502 is therefore used as part of a key for encrypting the current macroblock, with the initialization vector 505 used for the first block only. Ciphertext from the row block ciphers 508 and column block ciphers 510 are then combined 512 to generate final ciphertext 514 for the current macroblock, and the final ciphertext is used in encryption of the following macroblock. In an alternative embodiment, ciphertext 514 is XOR-ed with a master key to generate the macroblock key for encrypting the following macroblock 503.

Figure 6:
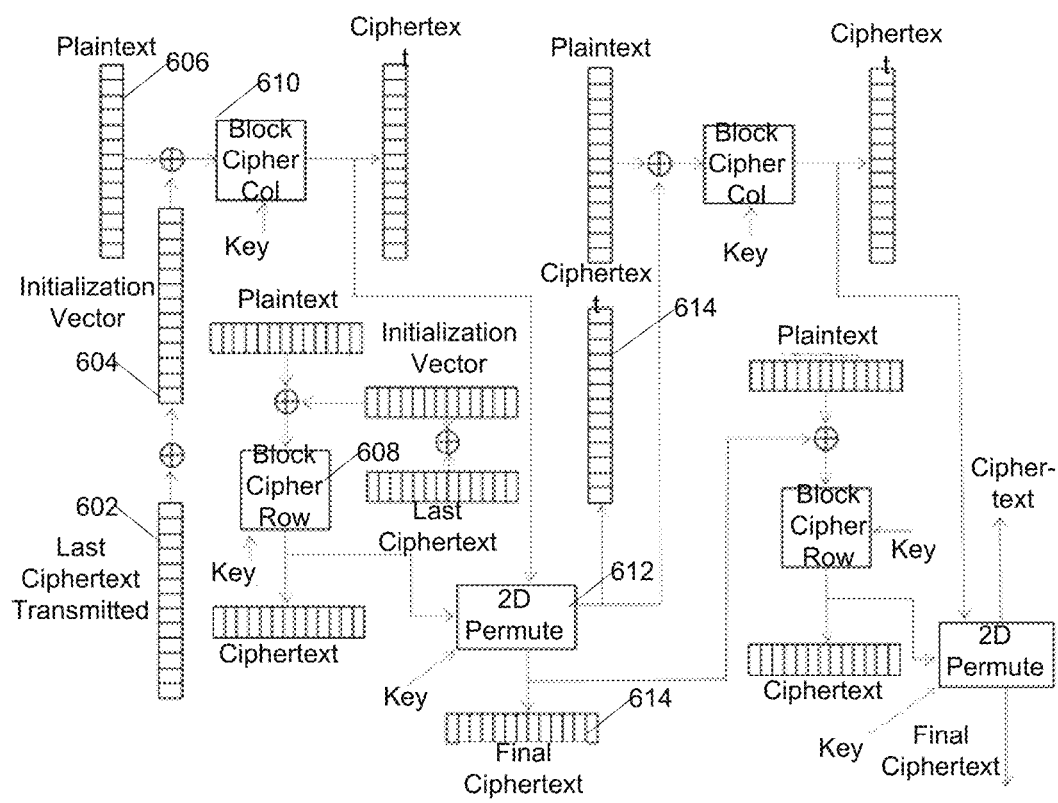
FIG. 6 is a block diagram illustrating a two-dimensional cross-session propagating block cipher.

Like the two-dimensional ECB, the two-dimensional CBC has one subkey per row and one subkey per column. In addition, there is one initialization vector for each column and each row. The subkeys and initialization vectors can be related to, or derived from, a single, exposed master key and master initialization vector for the rows $Key_{row[0]}$, $IV_{row[0]}$) and a single, exposed master key and master initialization vector for the columns ($Key_{column[0]}$, $IV_{column[0]}$). All non-master keys and initialization vectors can be derived from the masters. This concept can be extended to any number of dimensions. Notice that, within an encryption session, the CBC mode encryption generates a different ciphertext for each block of plaintext, regardless of the content of the plaintext blocks. Further, notice that the initialization vector is the same for all keys and all plaintext. This means that same plaintext encrypted using the same key will produce the same ciphertext. If encryption occurs between a pair of communicating systems (encrypt—transmit—receive—decrypt) and the final, sent ciphertext is remembered at the next session, then the CBC can be made safer by expanding the block chaining such that it is no longer session bound. This changes the one or greater dimensional CBC to the MPT Cross Session CBC as shown in FIG. 6.

Multidimensional Propagating Cipher Block Chaining

A common cryptanalytic attack is for an unauthorized party to record multiple messages or multiple stored files for duplicate ciphertext blocks and to maintain databases of messages and message formats. Duplicate portions may correspond to message headers and traditional forms of addressing a recipient encrypted with similar keys and can be used both to attack messages and analyze the system. Duplicate portions were helpful in the Venona breaks into reused Russian "one time pads" of the 1950s and 1960s. Known message formats and message headers were useful in formulating "cribs" for bombe-based key-recovery of Enigma messages during World War II.

In a high noise environment, a message or file number may be used as part of a key or initialization vector of each message in order to prevent the first portion of successive messages from encrypting into similar ciphertext. In a low noise environment, in order to prevent the first portion of successive messages from encrypting into similar ciphertext, a portion of ciphertext of a previous message or stored file may be used as part of a key for encrypting following messages or stored files in a message-propagating, macroblock-chaining embodiment.

In an embodiment as illustrated, half of ciphertext 602 from an earlier block or in an embodiment the immediately preceding block, or from the last block of an earlier message for the first macroblock of a message, is used to encipher (in some embodiments enciphered by XOR-ing, in others by piecewise modulo addition) with the initialization vector 604 to produce an effective initialization vector for the macroblock. This effective initialization vector is then XOR-ed with the received plaintext macroblock 606 before the iterated row block ciphers 608 and column block ciphers 610 are performed. This ciphertext 602 is therefore used as part of a key for encrypting the current macroblock, and a final ciphertext from a prior message as part of the key for encrypting the first macroblock. Ciphertext from the row block ciphers 608 and column block ciphers 610 are then combined 612 to generate final ciphertext 614 for the current macroblock, and the final ciphertext 614 is used in encryption of the following macroblock. In an alternative embodiment, ciphertext 602 is XOR-ed with a master key to generate the macroblock key for encrypting the macroblock.

Multidimensional Cipher Feedback (CFB) Mode Encryption

Figure 7:
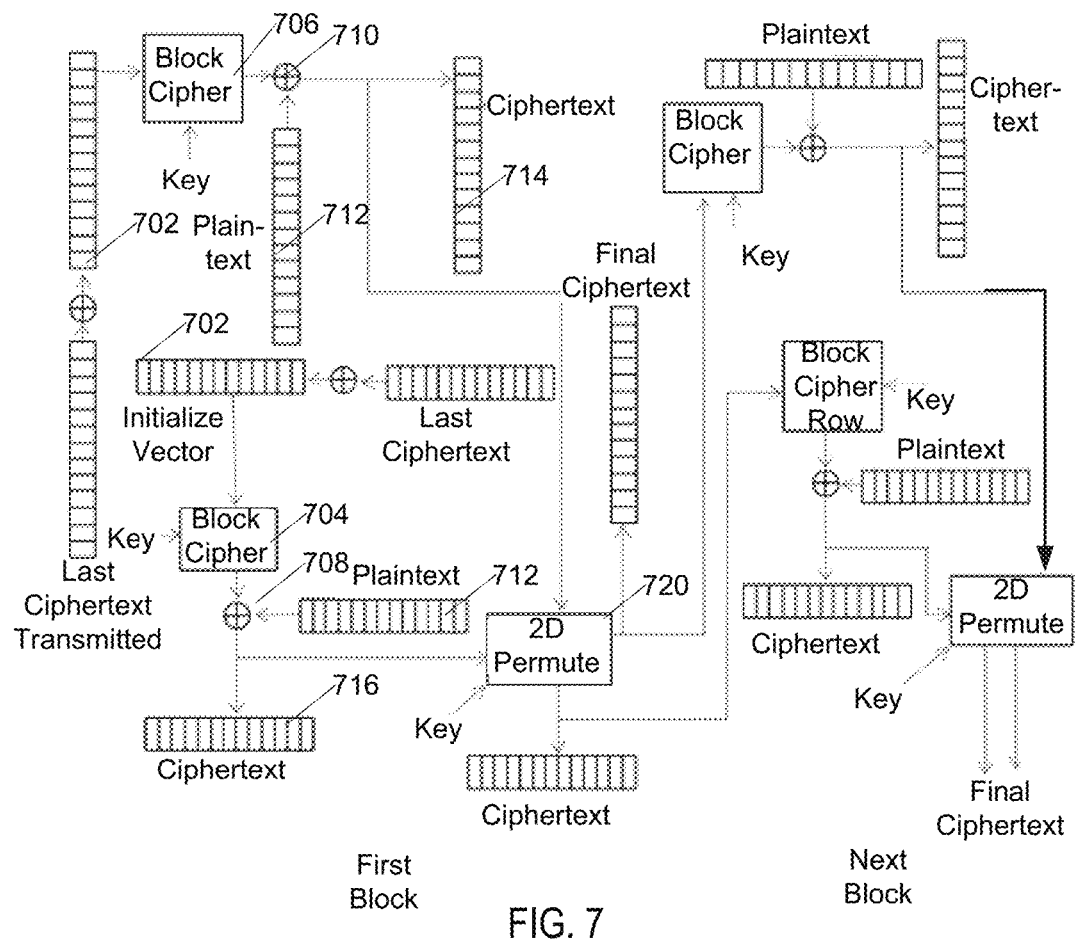
FIG. 7 is a block diagram illustrating a two-dimensional cross-session chaining block cipher.

FIG. 7 illustrates an example of a two-dimensional Cipher Feedback mode encryption scheme. A two-dimensional CFB is very similar to the two-dimensional PCBC. Like the PCBC, it can also be expanded into an MPT Cross Session version.

Instead of performing a block cipher on plaintext according to a key, the block cipher may be run 704 on rows of the initialization vector 702 according to the row keys and run 706 on columns of the initialization vector 702 to generate scrambled row keys and scrambled column keys. The scrambled row keys and scrambled column keys are then XOR-ed 708, 710 with the rows 712 or columns 714 of plaintext to produce column 716 and row 718 ciphertexts. These column and row ciphertexts are thereupon combined 720 to generate a final ciphertext using one or more rounds of transposition/permutation and, in an embodiment, substitution, as previously described. As before, the generated ciphertext from each macroblock is used as an initialization vector for each successive macroblock.

Figure 8:
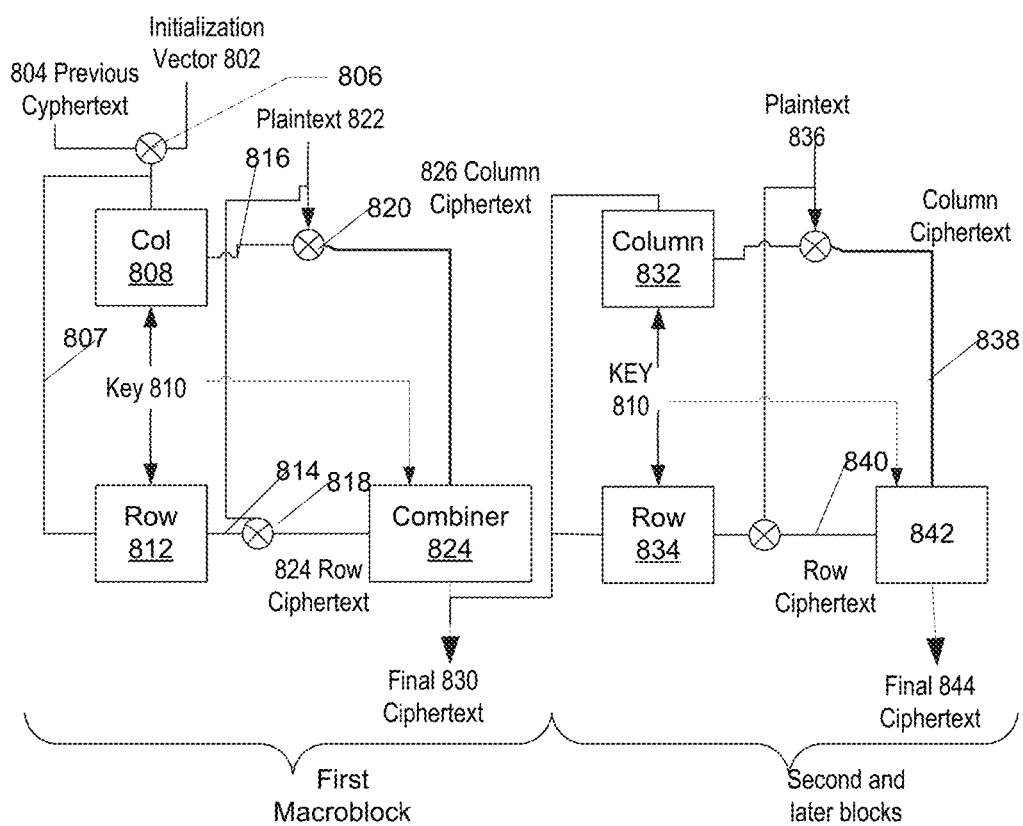
FIG. 8 is a block diagram illustrating a two-dimensional chaining output-feedback cipher.

Multidimensional Cross-Session, Chaining, Cipher Feedback (CSCFB) Mode Encryption FIG. 8 illustrates an example of a two-dimensional cross-session cipher-feedback mode encryption scheme.

An initialization vector 802 is used to encipher, in an example by XOR-ing 806 a last macroblock of a previous ciphertext message 804, such as a previous message in a sequence of messages, to produce an initial block 807. When no previous message is available because messages are known to be corrupt or missing, or for a first message of a particular sequence or time period, a value selected from a table of initial values may substitute for the last macroblock of previous ciphertext.

Instead of performing a block cipher on plaintext according to a key, the block cipher may be run 808 on columns of the initial block 807 according to the row keys and also run 812 on columns of the initial block to generate scrambled row keys 814 and scrambled column keys 816. The scrambled row keys and scrambled column keys are then XOR-ed 818, 820 with the rows or columns of plaintext 822 to produce column 824 and row 826 ciphertexts. These column and row ciphertexts are thereupon combined by transposition, permutation, and substitution in key-controlled combiner 828 to generate a final ciphertext 830 using one or more rounds of transposition/permutation and, in an embodiment, substitution, as previously described. As before, the generated ciphertext 830 from each macroblock is used as an initialization vector for each successive macroblock, being subjected to column block cipher 832 and row block cipher 834. Outputs of row and column block ciphers are used to encipher, in an embodiment by XOR-ing, columns and rows respectively of a successive plaintext block 836 to form column ciphertext 838 and row ciphertext 840, which are then combined by transposition, permutation, and substitution in key-controlled combiner 842 to produce that successive macroblock's ciphertext 844. Successive ciphertext 844 is processed similarly to generate row and block keys for following macroblocks, if any, and, if there is no following macroblock of this message, introduced as the last macroblock of a preceding message 804 when processing a following message.

Multidimensional Output Feedback (OFB) Mode Encryption

Figure 9:
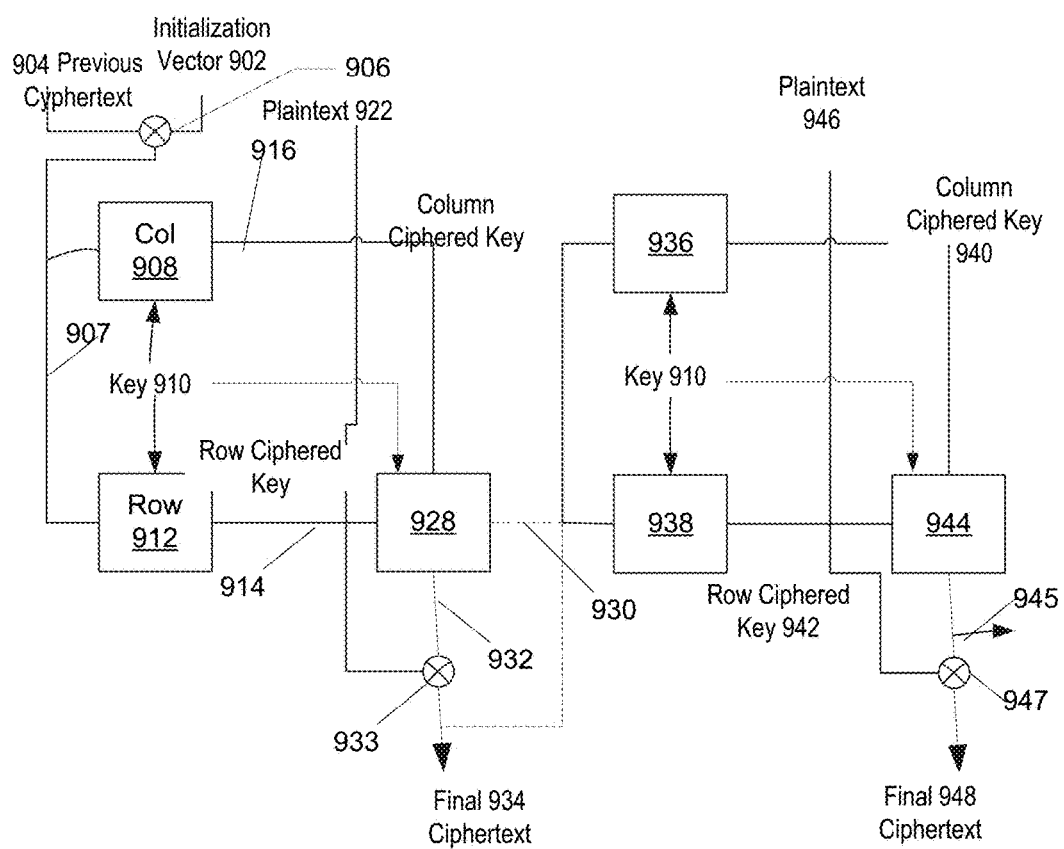
FIG. 9 is a block diagram illustrating a two-dimensional chaining output-feedback cipher.

FIG. 9 shows an example of a two-dimensional Cross-Session Output Feedback mode encryption scheme.

In this embodiment, an initialization vector 902 is used to encipher, in an example by XOR-ing 906 a last macroblock of a previous ciphertext message 904, such as a previous message in a sequence of messages, to produce an initial block 907. When no previous message is available because messages are known to be corrupt, or for a first message of a particular sequence or time period, a value selected from a table of initial values may be substituted for the last macroblock of previous ciphertext or for the enciphered previous ciphertext.

Instead of performing a block cipher on plaintext according to a key, the block cipher may be run 908 on columns of the initial block 907 according to the row keys and also run 912 on columns of the initial block to generate scrambled row keys 914 and scrambled column keys 916. The scrambled row keys and scrambled column keys are then combined by transposition, permutation, and substitution in key-controlled combiner 928 to generate a double-length final key 930 using one or more rounds of transposition/permutation and, in an embodiment, substitution, as previously described. A single-length, or row-length, excerpt 932 from the final key 930 is used to encipher 933, in an embodiment by XOR-ing, although other enciphering methods such as modulo addition may be used, a macroblock of plaintext 922 to produce a first macroblock of ciphertext 934.

As before, the generated final key 930 from each macroblock, or in an alternative embodiment the macroblock of ciphertext 934, is used as an initial block for each successive macroblock, being subjected to column block cipher 936 and row block cipher 938 to form column 940 and row 942 keys. The column and row keys are then combined by transposition, permutation, and substitution in key-controlled combiner 944 to produce that successive macroblock's final key 945. A row-length portion of final key 945 is used to encrypt 947 that macroblock's plaintext 946 to produce the successive ciphertext 948. Successive ciphertext 948 is processed similarly to generate row and block keys for following macroblocks, if any, and, if there is no following macroblock of this message, introduced as the last macroblock of a preceding message 904 when processing a following message.

In an embodiment, the key 910 is a long key having non-overlapping fields for row and column block ciphers and for the combiner.

Multiple Levels of Security and Compartments

In both database and communications applications, there are times when an encryption system should offer multiple levels of security. For example, the Naval Enigma system of World War II had basic, general-use and officer-only keys; some particularly sensitive messages were enciphered first with the officer-only key, an additional header was then added to advise of double encryption and who was authorized to decrypt the message body, and the message was re-encrypted with the daily general-use key.

Figure 9A:
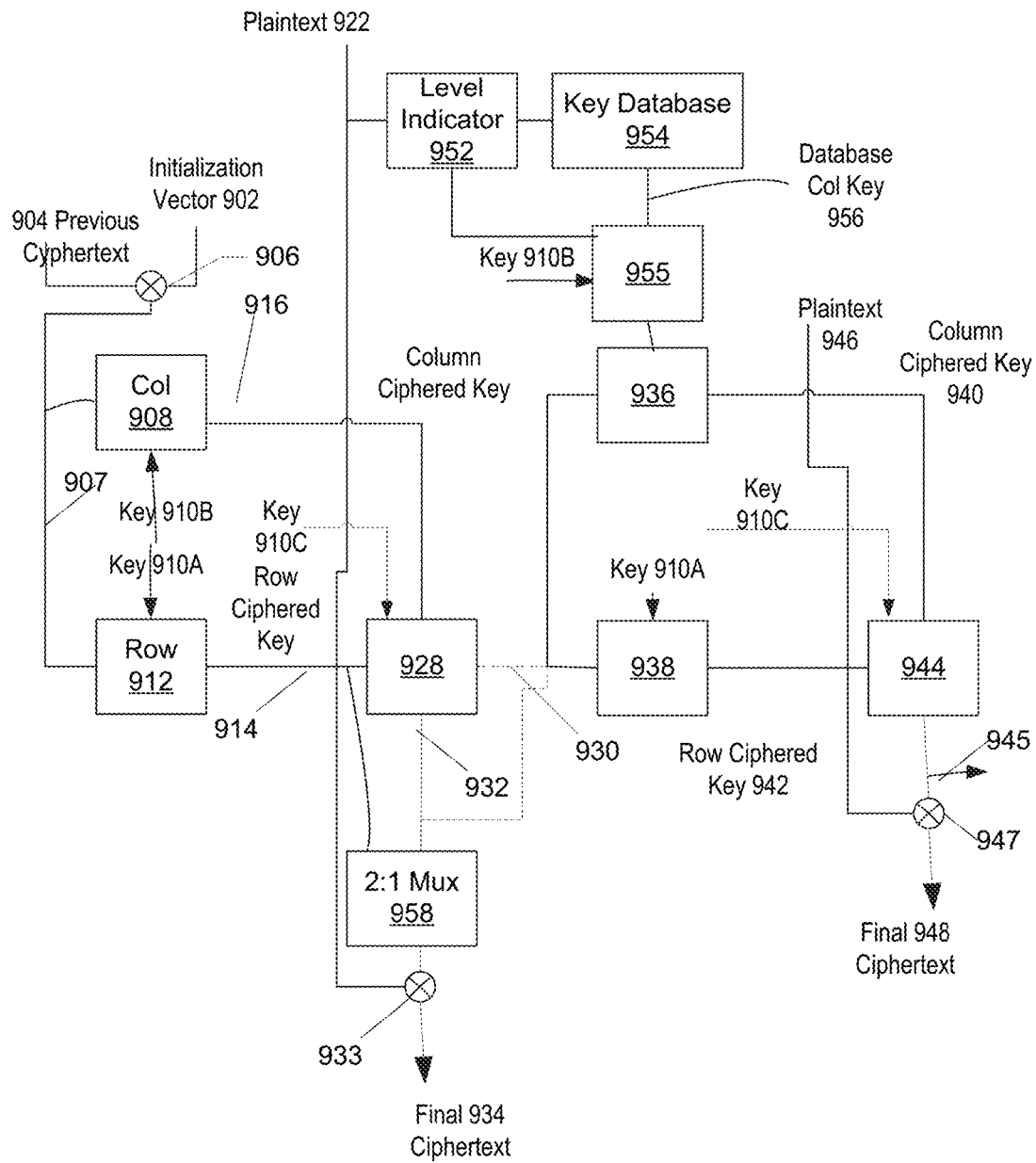
FIG. 9A illustrates the system of FIG. 9 adapted for multiple levels of security and/or compartmentalization.

The system herein described is readily adapted to support multiple levels of access both for communications and for database storage. FIG. 9A illustrates an adaptation of system of FIG. 9 to support multiple levels of security. In this adaptation, a level indicator 952 field is incorporated into macroblocks of plaintext 922, in an embodiment level indicator 952 is incorporated into the first macroblock of a message or stored file, and in an alternative embodiment, level indicator 952 is incorporated into additional macroblocks of the file.

The first macroblock of a message or a file contains only information that is determined to be available to recipients with a first level of access. The first macroblock of the message or file is encrypted using a first-level previously-shared key, which in an embodiment is a general-use, date-dependent key and which includes a row key portion 910A, a column key portion 910B, and a combiner key portion 910C. Key database 954 is initialized with keys corresponding to levels of access and compartments of access for users intended to have access to the message or file. In this embodiment, the first macroblock is restricted to contain only information available to users authorized at the first level of security.

When a particular macroblock is to be followed by a successive macroblock that contains content intended to be available only to users authorized at a second level of security, or in a particular compartment of a compartmentalized security system, level indicator 952 is provided in the first macroblock, used as an index into key database 954, and at least one key portion, such as column key 910B, is replaced with a key 956 from key database 954 by a 2:1 multiplexer 955. In particular embodiments, additional key processing as heretofore described with reference to column and row keys is performed on key 956. In an embodiment, to add further confusion to encrypted results, a mode bit associated with each file or message may cause the first macroblock of each message or file to be encrypted only according to row-ciphered key 914 instead of combiner output 932.

Remaining blocks of FIG. 9A operate according to their description given above with reference to FIG. 9.

During decryption of messages or files that were encrypted according to the scheme of FIG. 9A, key database 954 is initialized with keys corresponding to levels of access and compartments of access to which a current user is permitted access.

During decryption of messages or files that were encrypted according to the scheme of FIG. 9A, decryption begins with a first-level key. Each macroblock decrypted is inspected to determine if it incorporates a level indicator corresponding to level indicator 952. If a level indicator is found, the level indicator is used to select an appropriate key from key database 954, which in an embodiment is a column key, and in an alternative embodiment a row key, that is used for decrypting the following macroblock. If a level indicator is found that does not correspond to a key in key database 954, an attempt is made to decrypt following macroblocks with the first-level key; if decryption is unsuccessful, it is presumed that the current user does not have authorization to access that portion of the message or file.

The system of FIG. 9A is anticipated to be of use in systems such as medical record systems, where a first level of access may allow access to certain portions of patient data, such as patient name, address, and insurance identification, a second level of access may allow access to both patient identification, current prescriptions, and hourly nursing reports, and a third level may allow access to physicians' notes, lab reports, and images as well as current prescriptions and hourly nursing reports. In this system, the key database is configured with keys according to access rights of particular users of the system—some of which may be read directly from a security pass or access card held by the user.

Similarly, the system of FIG. 9A is adaptable to use by government contractors and agencies employing a multiple-level security classification system and security compartmentalization; the key database is configured with keys according to access rights assigned to a particular user accessing the system.

The systems described with reference to FIG. 4, 5, 6, 7, or 8 may be adapted for multiple levels of security or multiple security compartments in a manner similar to that discussed herein with reference to FIG. 9A.

Multiprocessor Embodiments for Multidimensional Encryption

It is anticipated that the methods of FIG. 4-11 may execute on traditional single or multiple-processor systems as known in the art of computing, having memory configured with instructions for each step of the method and for holding plaintext and encrypted macroblocks.

Figure 10:
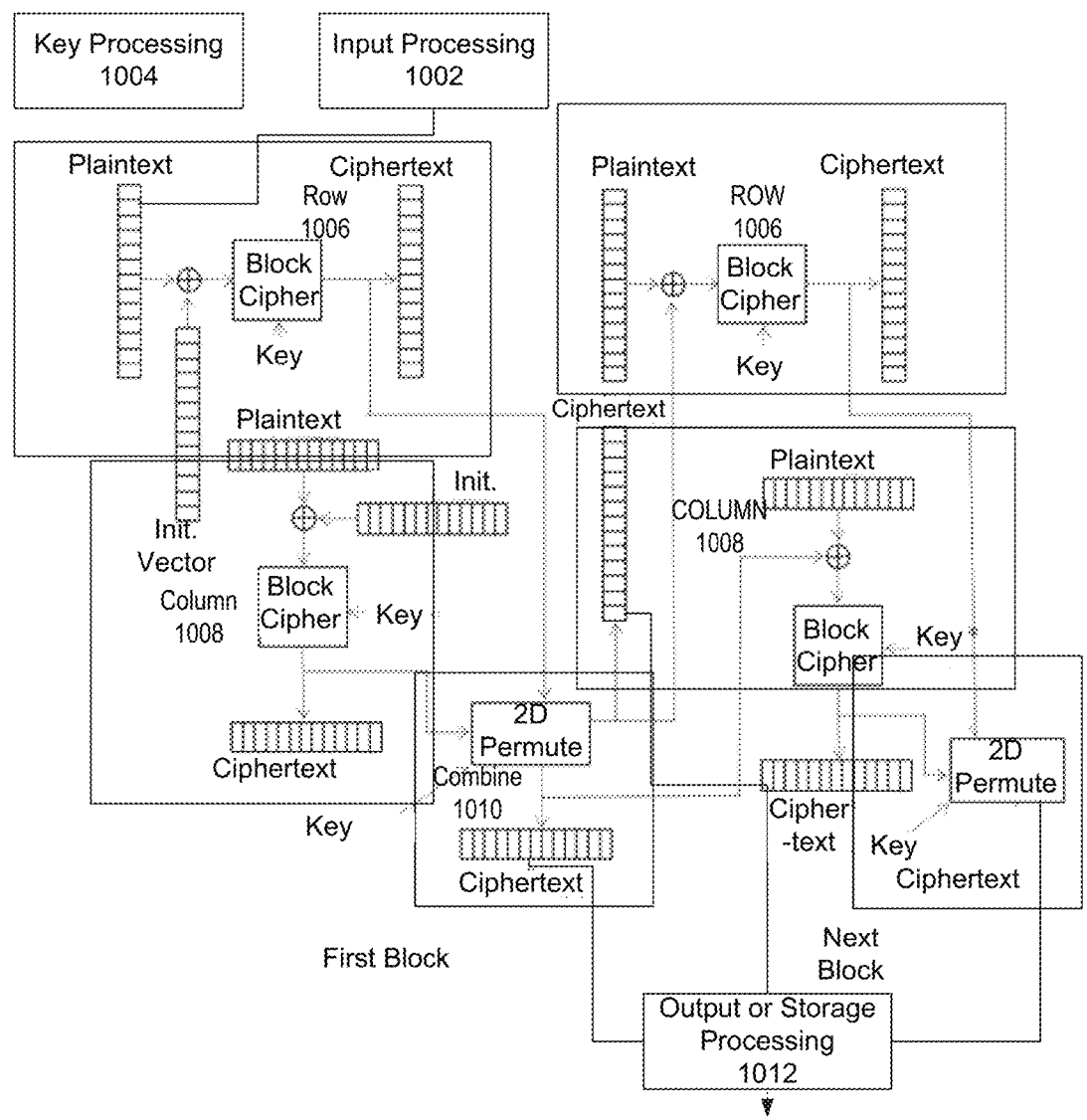
FIG. 10 is a block diagram illustrating how a two-dimensional cross-session propagating, chaining, block cipher could have tasks allocated to multiple processors for parallel execution.

For high performance, we note that small processors having limited amounts of memory have become cheap, especially when compared to high-performance, large-memory machines. Encryption and decryption bandwidth requirements can be quite high, especially in encrypted data storage systems. In order to perform multidimensional encryption and decryption at high speed, consider the multidimensional propagating block chaining encryption mode of FIG. 6. The operations required can be divided into Input 1002 (FIG. 10), Key Processing 1004, Row Processing 1006, Column Processing 1008, Combining 1010, and Output or Storage Processing 1012 functions. While FIG. 10 is derived from FIG. 7, a similar division between plaintext input functions (not shown in some figures), row processing 608, 812, 912, 508, column processing 908, 936, 610, 808, 510, combining 824, 842, 928, 944, 612, 512 or output (not shown in some figures) functions associated with the embodiments of FIG. 6, 7, 8, or 9 as well. Each of these functional divisions can be assigned to separate hardware. Further, given that each row or column of plaintext in the embodiments of FIG. 4, 5, 6, or 7, or in the embodiments of FIG. 8 or 9 the initial vector, is processed through a block cipher transformation independent of other rows or columns of the same macroblock, row processing and column processing can each be divided among several hardware units of an array processor with each hardware unit of the array processor processing one or more rows, or one or more columns, of a total number of rows and columns. For example, but not limitation, an exemplary embodiment, having 128 columns and 128 rows, 32 row processors and 32 column processors are provided, each processor performing row or column processing for 4 rows. A physical hardware system may therefore resemble the parallel encryption system of FIG. 11.

Figure 11:
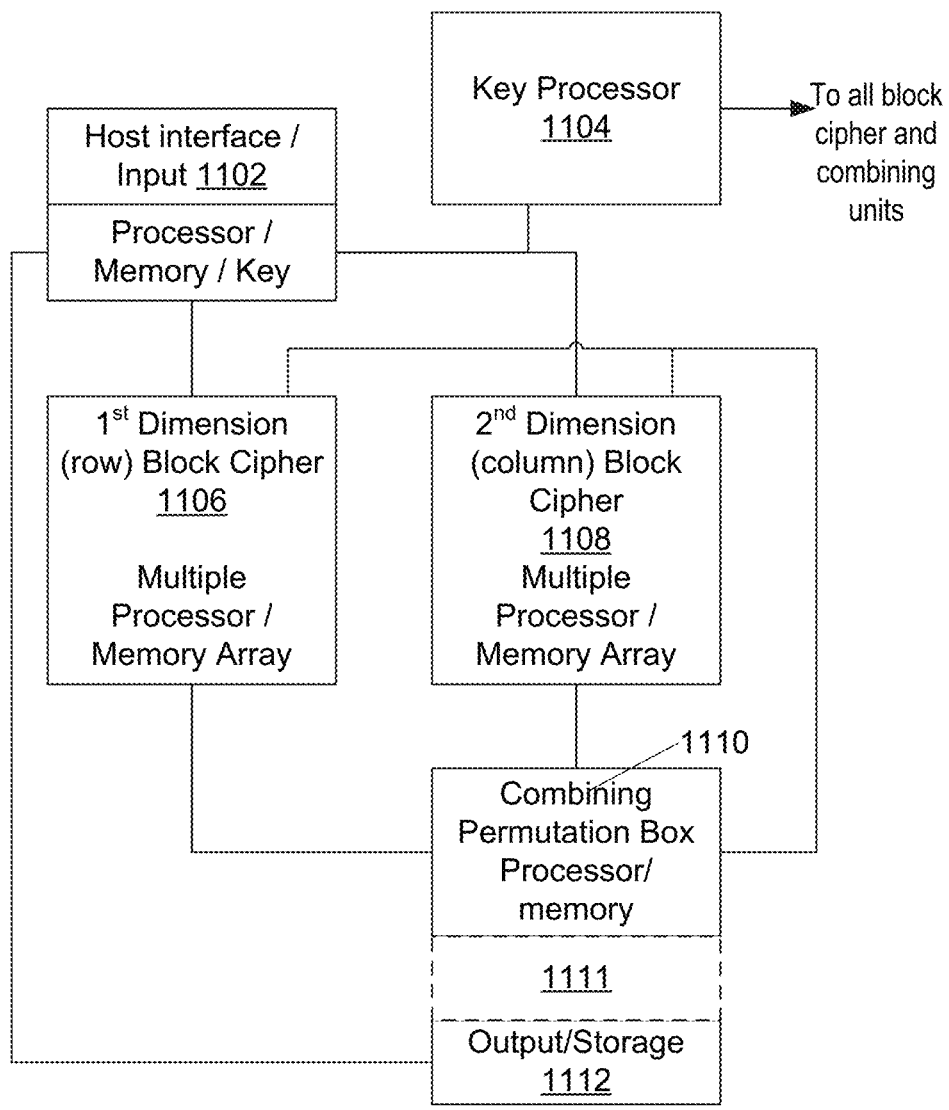
FIG. 11 is a block diagram of a system for implementing a block cipher in a system for encrypting a communications or storage stream.

The parallel encryption system of FIG. 11 has a first hardware unit, host interface and input unit 1102 for receiving keys and plaintext data from communications equipment or a host computer. A second hardware unit 1104, which may include a processor, provides for key manipulations, including deriving macroblock keys from a master key, and for deriving individual row and column keys from the master key.

A third hardware unit 1106 processes rows, which in an embodiment is a single processor for encrypting all rows of a macroblock by executing a block cipher on each row, and in an alternative embodiment an array of processors where each processor executes the block cipher on one or more rows of the macroblock with the key. A fourth hardware unit 1108 processes columns, which in an embodiment is a single processor for encrypting all columns of a macroblock or initial vector by executing a block cipher on each column, and in an alternative embodiment an array of processors where each processor executes the block cipher on one or more columns of the macroblock.

A fifth hardware unit, combiner 1110, combines the columns and rows with transposition, permutation, and/or substitutions. In embodiments according to FIG. 9, a final data-encrypter hardware unit 1111 may be provided. Finally, a sixth hardware unit, output or storage interface unit 1112 outputs, encrypted data and/or stores that encrypted data on storage media.

A multiple-processor system similar to that of FIG. 11 may be used for decryption, and in an embodiment of a data storage system implementing the method of FIG. 9, output/storage interface unit 1112 reads encrypted data and uses the combined key generated by combiner 1110 to decrypt data; this data is transmitted to host interface/input unit 1102 for transmission to the host.

In a particular embodiment of a storage system, the initialization vector for the first macroblock of a file may be derived from the physical location of the first sector of the file to ensure a unique initialization vector for each file, and chaining is used from macroblock to macroblock of each file.

Figure 12:
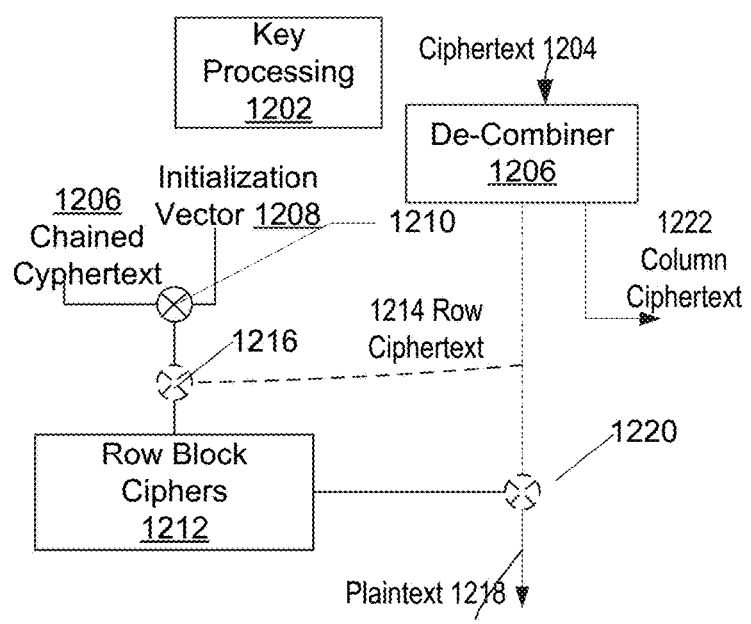
FIG. 12 is a block diagram of data flow illustrating decryption.

In a storage system embodiment implementing a method as illustrated with reference to FIG. 6 or 7, decryption operates roughly according to FIG. 12, on hardware as illustrated in FIG. 11, with key processing 1202 performed by key processor 1104 as for encryption. Ciphertext 1204 is received through storage interface 1112, and combiner 1110 operates its substitutions and permutations in reverse as a decombiner 1206 using the combining key to separate row and column ciphertext. Meanwhile, any chained ciphertext from a preceding macroblock and the initialization vector, which may include a file address, are processed by an encrypter 1210 in the same way these are processed during encryption to provide an initial vector for first dimension, or row processing processor array 1106. Row ciphertext 1214 in embodiments encrypted according to FIG. 4, 5, or 6 is processed 1216 with the initial vector to seed a row array, and row block cipher 1212 is operated on row processors 1106 in reverse to decrypt the macroblock to form plaintext 1218. In embodiments encrypted according to FIG. 7 or 8, the initial vector is used directly to seed the row array; row block cipher 1212 is operated on row processors 1106 using the row key as for encryption to generate a local key, which is used to decrypt 1220 to decrypt the row ciphertext 1214 to plaintext 1218. Plaintext 1218 is then transmitted through host interface 1102 to the host computer.

Since row ciphertext is redundant with column ciphertext, column ciphertext may be discarded during decryption in some embodiments, and in other, error-detecting embodiments, the column ciphertext 1222 may be processed on second dimension or column processors 1108 using the column key to form a column plaintext. The column plaintext is then compared to row plaintext to verify correct decryption.

In embodiments where column ciphertext is discarded, column processors 1108 may operate as additional row processors to provide decryption speed for storage systems where data reading is often done far more often than data writing.

A system as illustrated in FIG. 11 may be used for encrypting a data stream of a communications system or may be used for encrypting a data stream of a storage system where the ciphertext is stored on a storage medium. A multiple-processor system as herein described should be capable of encrypting or decrypting data at very high rates, such that storage system speed is not significantly impaired by the encryption and decryption process.

Figure 13:
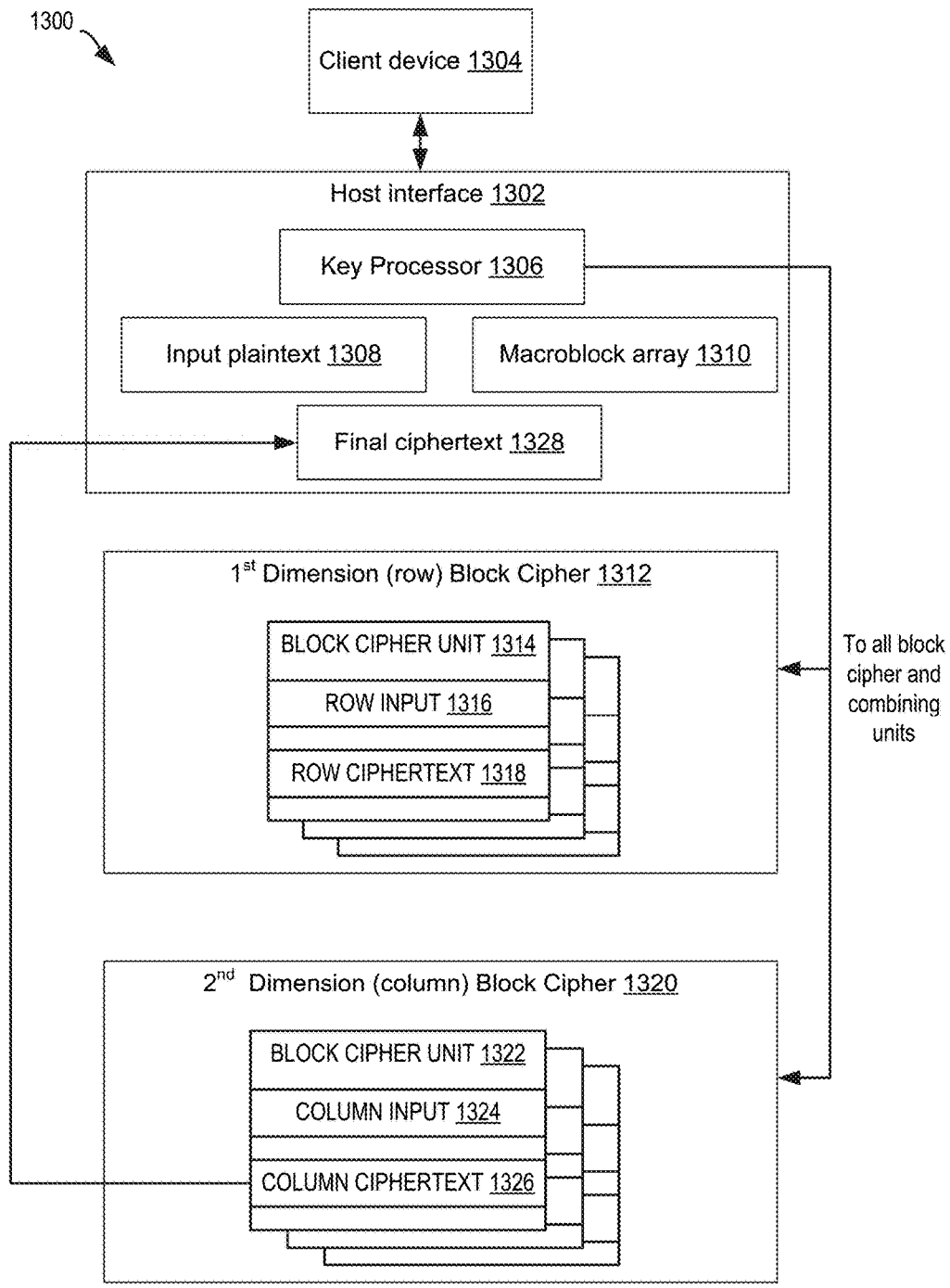
FIG. 13 depicts a parallel encryption system for secure communications and/or data storage with multidimensional encryption, which uses the above described principles of column and row deciphering with decreased memory space, in an embodiment.

FIG. 13 depicts a parallel encryption system 1300 for secure communications and/or data storage with multidimensional encryption, which uses the above described principles of column and row deciphering with decreased memory space, in an embodiment. The parallel encryption system 1300 may include a first hardware unit shown as host interface 1302 for receiving keys and/or plaintext data from a client device 1304 (such as communications equipment, a host computer, or any other device desiring to encrypt and store and/or communicate data). Host interface 1302 may be integral with, or separate from, client device 1304 without departing from the scope hereof. Host interface 1302 may include a digital processor (not shown) and non-transitory memory (not shown) storing computer readable instructions that when executed by the processor implement the functionality of host interface 1302 as discussed herein. Host interface 1302 may include a key manipulator 1306 (similar to key processor 1104, discussed above) for providing key manipulations, including deriving macroblock keys from a master key, and for deriving individual row and column keys from the master key in similar manner discussed above. Key manipulator 1306 may be integral within host interface 1302, or may be a separate device having its own digital processor and non-transitory memory storing computer readable instructions that when executed by the processor implement the functionality of the key manipulator 1306.

Host interface 1302 may be configured to receive an input plaintext 1308 from client device 1304 and transform the input plaintext 1308 into a macroblock array 1310, as discussed above, having N-by-M rows and columns.

The rows within macroblock array 1310 may then be distributed into a first dimension block cipher structure 1312. First dimension block cipher structure 1312 may include one or more block cipher units 1314 configured to operate in parallel with each other and each including a processor associated with memory using cipher keys received from key manipulator 1306. The memory of each block cipher unit 1314 may include two sections, such as row input 1316 and row ciphertext output 1318. Row input 1316, for each block cipher unit 1314, may include one or more of the rows within macroblock array 1310. As such, each row within macroblock array 1310 will be distributed into one of the block cipher units 1314 such that each block cipher unit 1314 has one or more of the rows from macroblock array 1310. Block cipher unit 1314 then performs a cipher on the data within row input 1316 based on output from key manipulator 1306 and stores said ciphered data as row ciphertext 1318.

Data from first dimension block cipher 1312 may then be distributed to a second dimension block cipher structure 1320 which may cipher the distributed data based on one or more cipher keys received from using from key manipulator 1306. As discussed in further detail below, in embodiments, second dimension block cipher 1320 may be the same hardware components as first dimension block cipher structure 1312. Data from each of the row ciphertext 1318 may be distributed to one of one or more block cipher units 1322. During this distribution, the data from row ciphertext 1318 may be subjected to a transposition (for example shown in FIG. 5 discussed above), permutation, substitution, or any other data distribution operation as discussed above. For a simplified example, assuming a 3-by-3 array, the ciphertext from the first bit (or byte) in the first "row" of row ciphertext 1318 may be distributed as the first bit (or byte) in the first "column" of column input 1324, the second bit (or byte) in the first "row" of row ciphertext 1318 may be distributed as the first bit (or byte) in the second "column" of column input 1324, the third bit (or byte) in the first "row" of row ciphertext 1318 may be distributed as the first bit (or byte) in the third "column" of column input 1324, the first bit (or byte) in the second "row" of row ciphertext 1318 may be distributed as the second bit (or byte) in the first "column" of column input 1324, and so on.

In embodiments, the first dimension block cipher structure 1312 may be the same hardware as the second dimension block cipher structure 1320. In such embodiments, the portion of memory corresponding to row input 1316 is re-written with the data entered as column input 1324. In other words, block cipher unit 1314 and block cipher unit 1322 are the same, and row input 1316 and column input 1324 are the same portions within the memory of each block cipher unit.

Once all processing within second dimension block cipher 1320 is completed, the column ciphertext 1326 is output as the final ciphertext 1328. The final ciphertext 1328 therefore has the same length as the input plaintext 1308, and has undergone a two cipher procedures with a transposition (or permutation, substitution, or other operation) therebetween.

Figure 14:
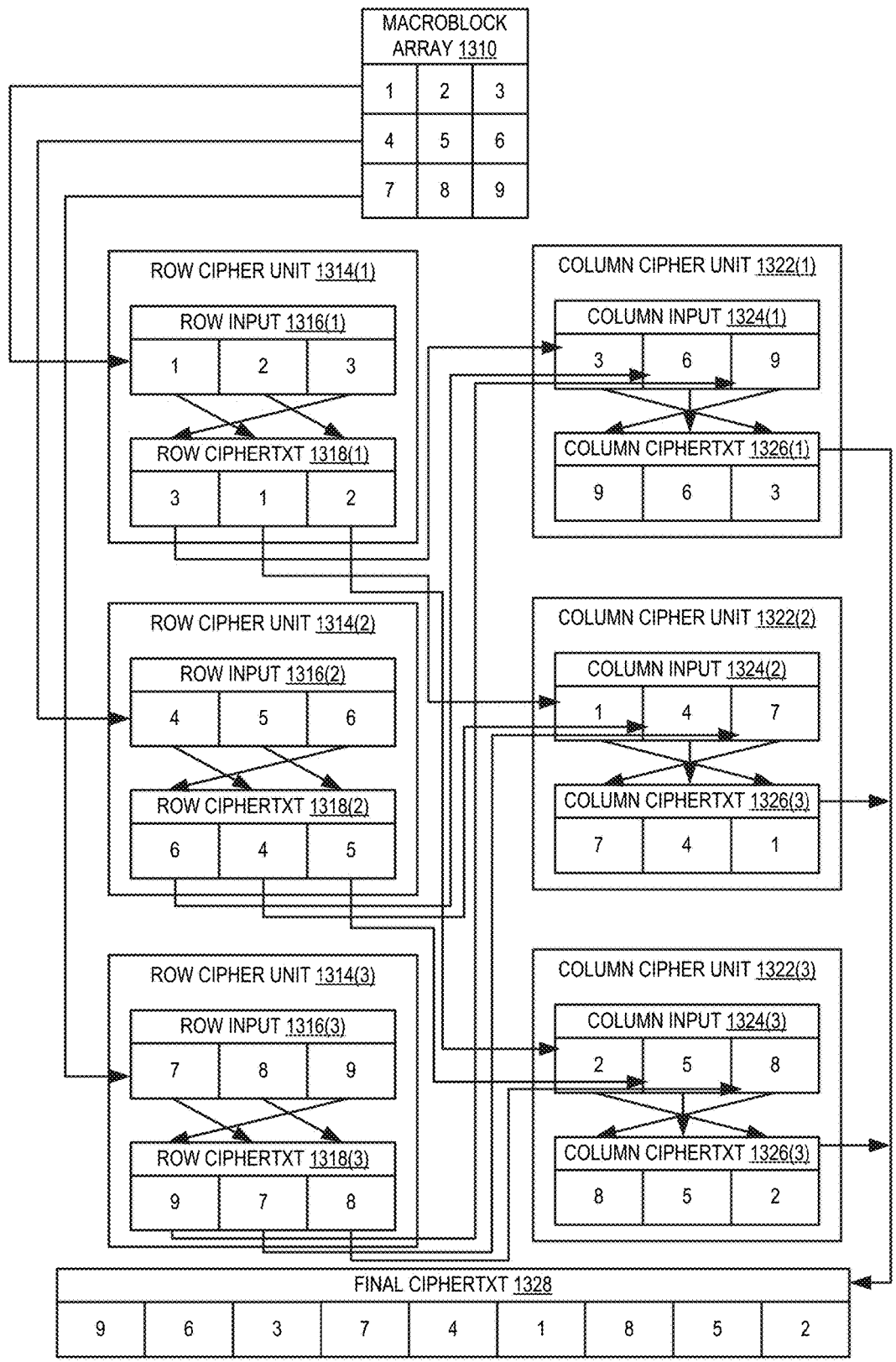
FIG. 14 depicts an example of operation of the system of FIG. 13.

FIG. 14 depicts an example of operation of the system of FIG. 13. The example shown in FIG. 14 assumes the following:

(1) a plaintext of "123456789" (in hexadecimal form);
(2) each row cipher unit 1314 holds one row of macroblock array;
(3) each column cipher unit 1322 holds one "column" of row ciphertext;
(4) each row cipher unit 1314 performs a ciphering operation including shifting each hexadecimal value of the row input data 1316 to the right within the row ciphertext 1318 (with the rightmost hexadecimal value of the row input data 1316 shifting to the leftmost hexadecimal value within the row ciphertext 1318); and
(5) each column cipher unit 1322 performs a ciphering operation including shifting the first hexadecimal value of the column input data 1324 to the last hexadecimal value position within the column ciphertext 1326, the second hexadecimal value of the column input data 1324 to the second hexadecimal value position within the column ciphertext 1326, and the third hexadecimal value of the column input data 1324 to the first hexadecimal value position within the column ciphertext 1326.

As shown in FIG. 14, the plaintext is loaded into macroblock array 1310 having a first row of "123", second row of "456", and third row of "789". The first row "123" is loaded into row input 1316(1) memory of first row cipher unit 1314(1). The second row "456" is loaded into row input 1316(2) memory of second row cipher unit 1314(2). The third row "789" is loaded into row input 1316(3) memory of third row cipher unit 1314(3).

Each of row cipher units 1314(1), 1314(2), 1314(3) may be configured to process in parallel with each other. First row cipher unit 1314(1) may perform a right shift operation to generate row ciphertext 1318(1) of "312". Second row cipher unit 1314(2) may also perform a right shift operation to generate row ciphertext 1318(2) of "645". Third row cipher unit 1314(3) may also perform a right shift operation to generate row ciphertext 1318(4) of "978". It should be appreciated that each individual cipher unit 1314 may perform a different operation than shown. Moreover, each individual unit 1314 may perform different operations from other units 1314 without departing from the scope hereof. Moreover, any ciphering method may be used to generate row ciphertext 1318 from row data 1316 data without departing from the scope hereof. The right shift operation is shown for clarity of illustration.

Once ciphering within first dimension block cipher 1312 (including each of row cipher units 1314(1), 1314(2), and 1314(3) are complete, the data within each row ciphertext 1318(1)-(3) may be transposed to second dimension block cipher 1322. This transposition is represented by the arrows between the row cipher units 1314 and column cipher unit 1322. An "array" of data can be seen between the combination of row ciphertexts 1318(1)-(3), This array includes a first "column" including the first hexadecimal of each respective row ciphertext 1318(1)-(3) being "369". The second "column" is "147" and the third "column" in the "array" is "258". Each hexadecimal value is transmitted to an appropriate one of the column cipher units 1322(1), 1322(2), or 1322(3) such that column input 1324(1) is "369", column input 1324(2) is "147", and column input 1324(3) is "258".

Once all data within each of column inputs 1324(1)-(3) is received by the respective column cipher units 1322(1)-(3), each column cipher unit 1322 may perform a cipher on the column input 1324.

Each of column cipher units 1322(1), 1322(2), 1322(3) may be configured to process in parallel with each other. First column cipher unit 1322(1) may perform a shift operation to generate column ciphertext 1326(1) of "963". Second column cipher unit 1322(2) may also perform a shift operation to generate column ciphertext 1326(2) of "741". Third column cipher unit 1322(3) may also perform a right shift operation to generate row ciphertext 1326(4) of "852". It should be appreciated that each individual cipher unit 1322 may perform a different operation than shown. Moreover, each individual unit 1322 may perform different operations from other units 1322 without departing from the scope hereof. Moreover, any ciphering method may be used to generate column ciphertext 1326 from column data 1324 data without departing from the scope hereof. The shift operation is shown for simplicity. Further yet, although the cipher operation performed by column cipher units 1322 is shown as different from the cipher operation performed by row cipher units 1314, each unit may perform the same cipher operations without departing from the scope hereof.

Once ciphering within second dimension block cipher 1320 (including each of column cipher units 1322(1), 1322(2), and 1322(3)) is complete, the data within each row ciphertext 1326(1)-(3) may be combined to generate final ciphertext 1328. For example, based on the operations within FIG. 14, the final ciphertext 1328 is "963741852". It should be appreciated that there may be any one or more operations performed on the column ciphertext 1326 prior to generation of final cipher text 1328, including an additional transposition and ciphering (e.g. additional "dimensions" of encryption) without departing from the scope hereof. As such, there may be an additional dimension block cipher structure (including additional cipher units similar to units 1314, 1322) capable of processing further dimensions of data for encryption.

System 1300 and the example shown in FIG. 14 may operate according to a Howard Cascade model. The Howard Cascade operates where each node (e.g. host interface 1302, and each of block cipher units 1314 and block cipher unit 1322) are part of a coordinated communication system. Therefore, for each time segment in the communication system, each node knows exactly where to transmit the data within its given memory slots. For example, within the example shown in FIG. 14, each row cipher unit 1314 knows exactly where to transmit data within row ciphertext data 1318. For example, row cipher unit 1314(1) knows to transmit according to the following:

the first position of the first "row" within row ciphertext 1318(1) (i.e. "3") transmits to the first position within the first "column" input 1324(1) of column cipher unit 1322(1);

the second position of the first "row" within row ciphertext 1318(1) (i.e. "1") transmits to the first position within the second "column" input 1324(2) of column cipher unit 1322(2);

the third position of the first "row" within row ciphertext 1318(1) (i.e. "2") transmits to the first position within the third "column" input 1324(3) of column cipher unit 1322(3);

the first position of the second "row" within row ciphertext 1318(2) (i.e. "6") transmits to the second position within the first "column" input 1324(1) of column cipher unit 1322(1);

the second position of the second "row" within row ciphertext 1318(2) (i.e. "4") transmits to the second position within the second "column" input 1324(2) of column cipher unit 1322(2);

the third position of the second "row" within row ciphertext 1318(2) (i.e. "5") transmits to the second position within the third "column" input 1324(3) of column cipher unit 1322(3);

the first position of the third "row" within row ciphertext 1318(3) (i.e. "9") transmits to the third position within the first "column" input 1324(1) of column cipher unit 1322(1);

the second position of the third "row" within row ciphertext 1318(3) (i.e. "7") transmits to the third position within the second "column" input 1324(2) of column cipher unit 1322(2);

the third position of the third "row" within row ciphertext 1318(3) (i.e. "8") transmits to the third position within the third "column" input 1324(3) of column cipher unit 1322(3);

These transmissions are coordinated within the Howard Cascade because each node knows its position within the Howard Cascade and thereby knows which other nodes to communicate with.

As discussed above, each row cipher unit 1314(1)-(3) may be the same hardware as each column cipher unit 1322(1)-(3), respectively. As such, instead of transmitting into a separate hardware when the row ciphertext data 1318 is transmitted to the column input data 1324, the data within row input 1316(1)-(3) may just be re-written. This saves on cost associated with the hardware required to implement system 1300.

The system described above, in FIGS. 3-12, differs from system 1300 because the "row" and "columns" are derived from the initial macroblock array within the above described systems. However, within system 1300, the columns are derived not from initial macroblock array 1310, but instead from the row ciphertext data 1318. System 1300 therefore has the advantage of less memory requirement because system 1300 produces a final ciphertext that is equal to the length of the plaintext 1308, while still including a dual cipher process.

Figure 15:
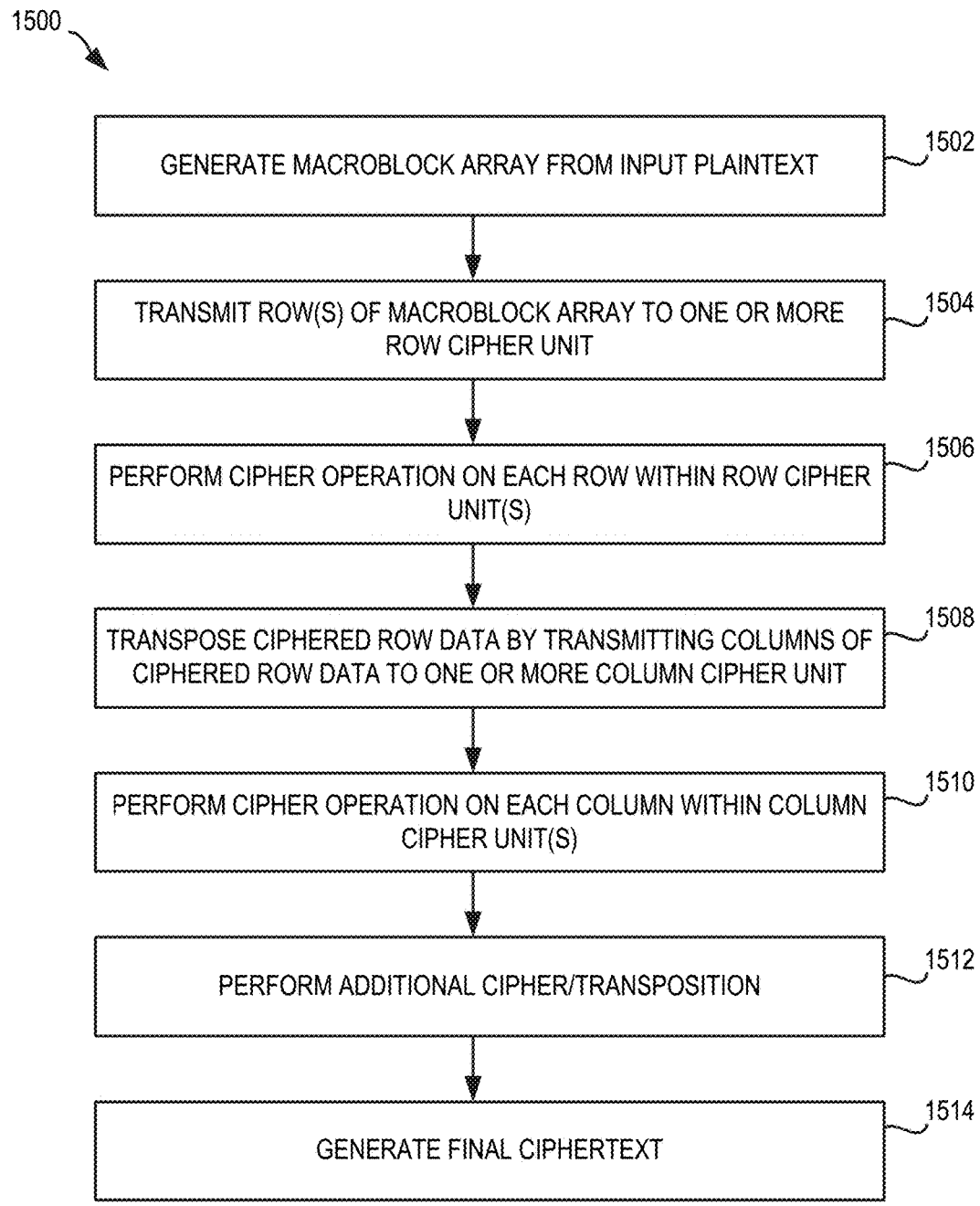
FIG. 15 depicts a method for secure communications and data storage using multidimensional encryption, in an embodiment.

FIG. 15 depicts a method 1500 for secure communications and data storage using multidimensional encryption, in an embodiment. Method 1500 may be implemented via system 1300 of FIG. 13, discussed above.

In step 1502, method 1500 generates a macroblock array from input plaintext. In one example of step 1502, host interface 1302 generates macroblock array 1310 based on input plaintext 1308 received from client device 1304.

In step 1504, method 1500 transmits one or more row(s) of the macroblock array to one or more row cipher units. In one example of step 1504, one or more row(s) within macroblock array 1310 are transmitted to respective block cipher units 1314 within first dimension block cipher structure 1312.

In step 1506, method 1500 performs a cipher operation on each row input data within the row cipher units. In one example of step 1506, each block cipher unit 1314 ciphers data within row input 1316 according to a cipher operation and generates row ciphertext 1318.

In step 1508, method 1500 transposes ciphered row data by transmitting columns of ciphered row data to one or more column cipher units. In one example of step 1508, columns within row ciphertext 1318 are transposed and transmitted to one or more block cipher units 1322 of second dimension block cipher structure 1320 and stored as column input 1324. It should be appreciated that step 1508 may occur via a Howard Cascade structure such that transmittal of data between first dimension block cipher structure 1312 and second dimension block cipher structure 1320 occurs according to a coordinated communication system where each block cipher unit 1314, 1322 has knowledge of their position within the Howard Cascade and thereby knowledge of where to transmit said data. It should be appreciated that in step 1508, operations may be performed other than a transposition, such as a permutation, substitution, addition, XOR, or other data operation.

In step 1510, method 1500 performs a cipher operation on each column input data within the column cipher units. In one example of operation of step 1510, each block cipher unit 1322 ciphers data within column input 1324 according to a cipher operation and generates column ciphertext 1326.

In step 1512, if included, method 1500 performs additional ciphers and/or transpositions, for example by repeating steps 1506-1510 on additional dimensions of data.

In step 1514, method 1500 combines the latest dimensions ciphertext to generate a final ciphertext. In one example of method 1500, column ciphertext 1326 is combined to generate final ciphertext 1328. Final ciphertext 1328 may be stored or otherwise communicated from host interface 1302 to external devices.

Conclusion

Using multidimensional encryption gives a higher level of security for all standard encryption modes. Higher dimensional versions of each common encryption mode are described which have the added benefit of permitting fast parallel execution.

Combinations

The concepts described herein may be combined in many ways in a product; the examples listed herein are exemplary and not by way of limitation. Among specific combinations of features anticipated herein are the following:

An encryption system designated A, having a least one processor and a memory system, the memory system configured to hold at least one macroblock, an encryption key, and machine-readable instructions for encrypting the macroblock, where the machine-readable instructions include instructions for dividing the macroblock into at least a first and a second subblock by rows; instructions for dividing the macroblock into at least a third and a fourth subblock by columns; instructions for deriving a first subkey, a second subkey, and a third subkey from the key; instructions for performing a block cipher on the first and second subblock according to row keys derived from the first subkey to produce first and second cipher blocks; instructions for performing the block cipher on the third and fourth subblock according to column keys derived from the second subkey to produce third and fourth cipher blocks; and instructions for performing a combining cipher of at least the first, second, third and fourth cipher blocks to produce a final ciphertext of the macroblock.

A system designated AA including the system designated A wherein there are at least two processors, and wherein the instructions for performing a block cipher on the first subblock are configured to execute on a different processor than the instructions for performing a block cipher on the third subblock.

A system designated AB including the system designated A or AA wherein there is a third processor, the third processor configured to execute machine-readable instructions for generating a key for the processing a later macroblock of a sequence of macroblocks A system designated AC including the system designated A, AA, or AB wherein the machine-readable instructions further comprise instructions for using at least part of the final ciphertext of the macroblock as at least part of a key for encrypting the later macroblock.

A system designated AD including the system designated A, AA, AB, or AC wherein the machine-readable instructions further comprise instructions for using at least part of the final ciphertext of the macroblock as at least part of a key for encrypting a later macroblock of a sequence of macroblocks.

A system designated AE including the system designated A, AA AB, AC, or AD wherein the machine-readable instructions further include instructions for subdividing the macroblock into at least one additional row subblock by rows, and into at least one additional column subblock by columns, for encrypting the additional row and column subblocks into at least an additional row and column encrypted subblock, and wherein the instructions for performing a combining cipher include instructions for using the additional row and column encrypted subblocks in the combining cipher to construct the final ciphertext.

A system designated AF including the system designated A, AA, AB, AC, AD, or AE wherein the machine-readable instructions divide the macroblock into an equal number of rows and columns.

A system designated AF including the system designated A, AA, AB, AC, AD, AE, or AF, wherein the machine-readable instructions further include instructions for subdividing the macroblock into at least a first and a second plane, where first, second, third, and fourth subblocks are within the first plane of the macroblock, where the machine-readable instructions comprise instructions for subdividing the second plane of the macroblock into a fifth, and sixth subblock by rows, and into a seventh, and eighth subblock by columns; the machine-readable instructions further comprise instructions for deriving a fourth subkey, a fifth subkey, and a sixth subkey from the key; the machine-readable instructions further comprise instructions for performing a block cipher on the fifth and sixth subblock according to row keys derived from the fourth subkey to produce fifth and sixth cipher blocks; the machine-readable instructions further comprise instructions for performing a block cipher on the seventh and eighth subblock according to column keys derived from the fifth subkey to produce seventh and eighth cipher blocks; and wherein the machine-readable instructions for performing a combining cipher include the fifth, sixth, seventh, and eighth cipher blocks in generating the final ciphertext.

A system designated AH including the system designated A, AA, AB, AC, AD, AE, or AG, wherein a portion of a final ciphertext of a prior message is incorporated into the key.

A method of encryption designated B using a least one processor and at least one memory system, the memory system configured to hold at least one macroblock, an encryption key, and machine-readable instructions for encrypting the macroblock, including: dividing the macroblock into at least a first and a second subblock by rows; dividing the macroblock into at least a third and a fourth subblock by columns; deriving a first subkey, a second subkey, and a third subkey from the key; performing a block cipher on the first and second subblock according to row keys derived from the first subkey to produce first and second cipher blocks; performing a block cipher on the third and fourth subblock according to column keys derived from the second subkey to produce third and fourth cipher blocks; and performing a combining cipher of the first, second, third and fourth cipher blocks to produce a final ciphertext of the macroblock.

A method designated BA including the method designated B wherein the system comprises at least two processors, and the performing of a block cipher on the first subblock is by a different processor than the performing of a block cipher on the third subblock.

A method designated BB including the method designated B or BA further including using at least part of the final ciphertext of the macroblock as at least part of a key for encrypting a following macroblock of a sequence of macroblocks.

A method designated BC including the method designated BB wherein there is a third processor, the third processor configured to execute machine-readable instructions for generating a key for the processing the following macroblock of the sequence of macroblocks.

A method designated BD including the method designated BB further comprising subdividing the macroblock into at least one additional row subblock by rows, and into at least one additional column subblock by columns, encrypting the additional row and column subblocks into at least an additional row and column encrypted subblock, and wherein the combining cipher includes the additional row and column encrypted subblocks in the combining cipher to construct the final ciphertext.

A method designated BE including the method designated B, BA, BB, BC, or BD wherein the macroblock is divided into an equal number of rows and columns.

A method designated BF, including the method designated B, BA, BB, BC, BD, or BE, wherein the macroblock is subdivided into at least a first and a second plane, where first, second, third, and fourth subblocks are within the first plane of the macroblock, and further including dividing the macroblock into a fifth, and sixth subblock by rows, and into a seventh, and eighth subblock by columns; deriving a fourth subkey, a fifth subkey, and a sixth subkey from the key; performing the block cipher on the fifth and sixth subblock according to row keys derived from the fourth subkey to produce fifth and sixth cipher blocks; performing the block cipher on the seventh and eighth subblock according to column keys derived from the fifth subkey to produce seventh and eighth cipher blocks; and wherein the combining cipher includes the fifth, sixth, seventh, and eighth cipher blocks in generating the final ciphertext.

A method designated BG, including the method designated B, BA, BB, BC, BD, BE, or BF, wherein a portion of a final ciphertext of a prior sequence of macroblocks is incorporated into the key.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for multidimensional encryption comprising:
   a host interface storing input plaintext and including a processor and computer readable instructions that when executed by the processor generate a macroblock array, having a plurality of rows, based on the input plaintext;

a first dimension cipher structure configured to receive the plurality of rows and perform a first cipher operation to generate row ciphertext;

a second dimension cipher structure configured to receive column input data based on columns within the row ciphertext, and perform a second cipher operation to generate column ciphertext;

the first dimension cipher structure including a plurality of row cipher units including memory storing respective one or more of the received plurality of rows, and the row ciphertext corresponding to the one or more of the received plurality of rows, the plurality of row cipher units configured to process in parallel to each other when performing the first cipher operation;

the second dimension cipher structure including a plurality of column cipher units including memory storing respective one or more of the received columns, and the column ciphertext corresponding to the one or more of the received plurality of columns, the plurality of column cipher units configured to process in parallel to each other when performing the second cipher operation.

2. The system of claim 1, the plurality of column cipher units and the plurality of row cipher units being configured according to a Howard Cascade such that transmittal of the columns of row cipher text from the row cipher units to the column cipher units occurs based on a coordinated communication scheme.

3. The system of claim 1, the second dimension cipher structure including same hardware as the first dimension cipher structure.

4. The system of claim 1, the first cipher operation being different from the second cipher operation.

5. The system of claim 1, the column input data being transposed from the row ciphertext.

6. The system of claim 1, further comprising an additional dimension cipher structure configured to receive additional data based on the column ciphertext, and perform an additional cipher to generate additional ciphertext.

7. The system of claim 1, the final ciphertext having a length equal to a length of the input plaintext.

8. A method for multidimensional encryption of data, comprising:

generating a macroblock array, based on an input plaintext, having a plurality of rows of data;

transmitting respective one or more of the plurality of rows to each of a plurality of row cipher units of a first dimension cipher structure;

performing, in parallel by each of the plurality of row cipher units, a first cipher operation on the rows within the first dimension cipher structure to generate row ciphertext;

transmitting the columns of data within the row cipher text including transmitting respective one or more of the columns of data to each of a plurality of column cipher units of a second dimension cipher structure; and, performing, in parallel by each of the plurality of column cipher units, a second cipher operation on the columns of data to generate a column ciphertext.

9. The method of claim 8, the step of transmitting columns of data including transposing the row ciphertext to the second dimension cipher structure.

10. The method of claim 8, each of the plurality of column cipher units and the plurality of row cipher units being configured according to a Howard Cascade such that transmittal of the columns of row cipher text from the row cipher units to the column cipher units occurs based on a coordinated communication scheme.

11. The method of claim 8, the second cipher operation being different from the first cipher operation.

12. The method of claim 8, a final ciphertext being based at least in part on the column ciphertext and having the same length as the input plaintext.

13. A system for multidimensional encryption comprising:

a host interface storing input plaintext and including a processor and computer readable instructions that when executed by the processor generate a macroblock array, having a plurality of rows, based on the input plaintext;

a first dimension cipher structure configured to receive the plurality of rows and perform a first cipher operation to generate row ciphertext;

a second dimension cipher structure configured to receive column input data based on columns within the row ciphertext, and perform a second cipher operation to generate column ciphertext; and, output or storage interface for outputting a final ciphertext based at least in part on the column ciphertext, the final cipher text having increased security than the input plaintext.

14. The system of claim 13, the plurality of column cipher units and the plurality of row cipher units being configured according to a Howard Cascade such that transmittal of the columns of row cipher text from the row cipher units to the column cipher units occurs based on a coordinated communication scheme.

15. The system of claim 13, the second dimension cipher structure including same hardware as the first dimension cipher structure.

16. The system of claim 13, the first cipher operation being different from the second cipher operation.

17. The system of claim 13, the column input data being transposed from the row ciphertext.

18. The system of claim 13, further comprising an additional dimension cipher structure configured to receive additional data based on the column ciphertext, and perform an additional cipher to generate additional ciphertext.

19. The system of claim 13, the final ciphertext having a length equal to a length of the input plaintext.

* * * * *